United States Patent [19]

Stakhov et al.

[11] 4,187,500

[45] Feb. 5, 1980

[54] METHOD AND DEVICE FOR REDUCTION OF FIBONACCI P-CODES TO MINIMAL FORM

[75] Inventors: Alexei P. Stakhov; Jury M. Vishnyakov; Vladimir A. Luzhetsky; Alexandr V. Ovodenko; Nikolai A. Solyanichenko; Alexandr V. Fomichev, all of Taganrog, U.S.S.R.

[73] Assignees: Taganrogsky Radiotekhnichesky Institut, USSR, Taganrog, Taganrog; Vinnitsky Politekhnichesky Institut, USSR, Vinnitsa, Vinnitsa, both of U.S.S.R.

[21] Appl. No.: 816,510

[22] Filed: Jul. 15, 1977

[30] Foreign Application Priority Data

Jul. 19, 1976 [SU] U.S.S.R. ............................... 2386002

[51] Int. Cl.$^2$ .................... H03K 13/24; G06F 5/00
[52] U.S. Cl. .................... 340/347 DD; 235/310; 364/736
[58] Field of Search ................ 340/347 DD; 235/310

[56] References Cited

U.S. PATENT DOCUMENTS 4,032,979  6/1977  Rice .................. 340/347 DD X

*Primary Examiner*—Jerry Smith
*Attorney, Agent, or Firm*—Haseltine, Lake & Waters

[57] ABSTRACT

An arrangement for reduction of Fibonacci p-codes to minimal form, which performs, in succession, all convolutions and all devolutions of bits of the original Fibonacci p-code of a number, whereto the original combination of binary signals corresponds. The original combination of binary signals is handled during the convolution operation so that a binary signal corresponding to a 0 value of the lth digit of the original Fibonacci p-code of the number, as well as binary signals corresponding to 1 values of the (l - i)th and the (l - p - 1)th digit of the original Fibonacci p-code of the number, are substituted by their inverse signals. The original combination of binary signals is handled during the devolution operation so that a binary signal corresponding to a 1 value of the lth digit of the original Fibonacci p-code of the number, as well as binary signals corresponding to 0 values of the digits (l - p) through (l - 2p), inclusive, of the original Fibonacci p-code of the number, are substituted by their inverse signals.

21 Claims, 27 Drawing Figures

METHOD AND DEVICE FOR REDUCTION OF FIBONACCI P-CODES TO MINIMAL FORM

BACKGROUND OF THE INVENTION

This invention relates to data processing methods, and more particularly to a method of reduction of Fibonacci p-codes to minimal form and to a device for implementing this method.

The invention is applicable to many fields of computer engineering, including special-purpose digital computers, digital monitoring/diagnostic apparatus for complex automatic systems, means to provide for fidelity of data readout in digital measuring systems and apparatus, and means to provide for error control and failure diagnostics in digital data processing systems.

It is known that natural, fractional and negative numbers can be represented in Fibonacci p-codes which are obtained as a result of generalization of a conventional binary notation. Fibonacci binary number systems are available which are based on Fibonacci p-codes (cf. A.P. Stakhov, The Use of Natural Redundancy of Fibonacci Number Systems for Error Control of Computing Systems. Automation and Computing Machinery, No. 6, 1975 in Russian).

Generalized Fibonaccni numbers of Fibonacci p-numbers are called numbers $\phi_p(l)$ which are determined, with $p \geq 0$, from the following recurrence relation:

$$\phi_p(l) = \begin{cases} 0 \text{ when } l > 0; \\ 1 \text{ when } l = 0; \\ \phi_p(l-1) + \phi_p(l-p-1) \text{ when } l < 0. \end{cases}$$

By a Fibonacci p-code of a natural number N is meant the representation of that number in the form of the following sum:

$$N = \sum_{l=0}^{n-1} a_l \phi_p(l) \quad (2)$$

where
n is the code length,
$\phi_p(l)$ is the Fibonacci p-number according to (1), and
$a_l$ is a bit (0 or 1) in the lth place of the Fibonacci p-code.

With a given integer $p \geq 0$, there exist, for some natural N, unique non-negative integers i and r which give $$N = \phi_p(p+i) + r \quad (3)$$

$$0 \leq r \phi_p(i) \quad (4)$$

When $p=0$, the Fibonacci p-codes assume their values which are in coincidence with those of a conventional binary code, and when $p=\infty$, the Fibonacci p-codes represent a unitary code.

The numbers-theory properties of Fibonacci p-numbers are described in the article cited above.

The Fibonacci p-code, according to (2), is characterized, with $p>0$, by a redundancy, as compared to a conventional binary code ($p=0$). This means that each natural number N can be represented by several Fibonacci p-codes. For example, number 20, with $p=1$, can be represented by the following Fibonacci 1-codes:

| Digit weight | 21 | 13 | 8 | 5 | 3 | 2 | 1 | 1 | |
|---|---|---|---|---|---|---|---|---|---|
| Fibo- | 0 | 1 | 0 | 1 | 0 | 1 | 0 | 0 | |
| nacci | 0 | 1 | 0 | 1 | 0 | 0 | 1 | 1 | = 20 |
| 1-code | 0 | 1 | 0 | 0 | 1 | 1 | 1 | 1 | |
|  | 0 | 0 | 1 | 1 | 1 | 1 | 1 | 1 | |

Various Fibonacci p-codes of the same natural number N can be obtained with the aid of convolution and devolution operations performed on bits.

By convolution of the lth binary zero ($a_l=0$) and the $(l-1)$th, $(l-p-1)$th binary ones ($a_{l-1}=a_{l-p-1}=1$) of a Fibonacci p-code of a natural number N is meant an operation in which the values of the lth, $(l-1)$th and $(l-p-1)$th digits are substituted by their negations which can be expressed as

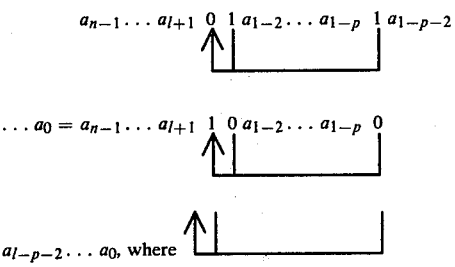

is the symbol of the convolution operation.

By devolution of the lth binary one ($a_l=1$) and binary zeros $(l-p)$ through $(l-2p)$ of a Fibonacci p-code of a natural number N is meant an operation in which the value of the lth digit and the values of digits $(l-p)$ through $(l-2p)$ are substituted by their negations, which can take the form

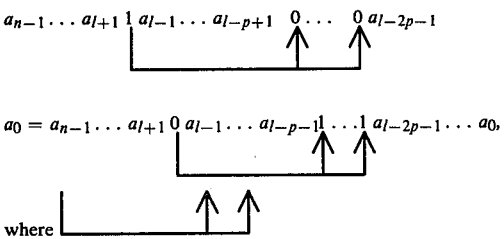

is the symbol of the devolution operation.

The convolution and/or devolution of bits in a Fibonacci p-code of a natural number N produces a new codeword which represents another Fibonacci p-code of the same number N in accordance with the definition of Fibonacci p-code. Among various forms of a Fibonacci p-code of the same number N, there is one and only one form of the (2) type which contains the minimum number of terms with unitary coefficients.

By the minimal form of a Fibonacci p-code of a number N is meant a Fibonacci p-code produced by sequential factorization, performed according to (3) and (4), of this number N and all remainders that appear in the course of the factorization until the last remainder becomes equal to zero.

Fractional numbers D can also be represented in Fibonacci p-codes. In the case of n-digit encoding of factorial numbers D in a Fibonacci p-code, the weight of the lth digit of an n-digit Fibonacci p-code of a proper fraction is given by the following recurrence relation:

$$q_p(1) = \begin{cases} 0 & \text{when } l \; 0; \\ \dfrac{1}{\phi_p(n)} & \text{when } l = 0; \\ q_p(l-1) + q_p(l-p-1) & \end{cases}$$
when $l > 0$, where $1 \leq n$.

With a certain integer $p \geq 0$, any proper fraction D has a unique representation, as follows:

$$D = q_p(p+i) + d, \tag{6}$$

where $$0 \leq d < q_p(i). \tag{7}$$

By a Fibonacci p-code of a proper fraction D is meant the representation of the fraction in the form of the following sum:

$$D = \sum_{l=0}^{n-1} a_l q_p(l) \tag{8}$$

where
n is the code length,
$Qq_p$ is the value according to (5), and
$a_l$ is a bit (0 or 1) in the lth place of the code.

Note that (6) is solved accurate to $q_p(0)$ in the case of any proper fraction D.

By the minimal form of a Fibonacci p-code of a proper fraction D is meant the form of the (6) type, obtained by sequential factorization of the fraction and all accompanying remainders, performed in accordance with (6) and (7), until the last remainder becomes a value less than $q_p(0)$.

The minimal forms of the Fibonacci p-codes of proper fractions possess all properties of the minimal forms of the Fibonacci p-codes of natural numbers.

Encoding negative numbers in a Fibonacci p-code is carried out using the concept of Fibonacci inverse and additional p-codes. The following relations exist to associate Fibonacci inverse and additional p-codes of natural numbers ($\overline{N}$ and $\overline{N}_2$) and fractional numbers ($\overline{D}$ and $\overline{D}_1$) with Fibonacci straight p-codes of numbers (N and D):

$$N + \overline{N} = \phi_p(n) - 1,$$
$$N + \overline{N}_1 = \phi_p(n),$$
$$\overline{N} + 1 = \overline{N}_1, \tag{9}$$
$$D + \overline{D} = 1 - (1/\phi_p{}^{(n)}),$$
$$D + \overline{D}_1 = 1,$$
$$D + (1/\phi_p(n)) = D_1.$$

To obtain a Fibonacci inverse p-code of the number N or D from its Fibonacci straight p-code of some N or D, it is sufficient to replace binary coefficients $a_2$ of the appropriate Fibonacci straight p-codes by their negations.

All basic arithmetic operations such as addition, multiplication and division of integers and fractional numbers can be performed on the minimal form Fibonacci p-codes of the numbers. Also, the following operations are possible: translation of a k-ary position code to a Fibonacci p-code; translation of a Fibonacci p-code to an inverse code; number comparison; counting; and subtraction of ones.

SUMMARY OF THE INVENTION

It is an object of the present invention to provide a method of reducing Fibonacci p-codes to minimal form, a device for reducing Fibonacci p-codes to minimal form, and a digital data-processing device based on this device for reducing Fibonacci p-codes to minimal form so as to increase the fidelity of data processing, to allow for monitoring of the operation of the subassemblies of said digital data-processing device without additional encoders and decoders, and to increase the operational reliability of the digital data-processing device.

Another object of the invention is to provide a device for reduction of Fibonacci p-codes to minimal form, which is able to handle data in parallel and to verify the form of representation of numbers in Fibonacci p-codes.

Still another object of the invention is to provide a device for reduction of Fibonacci p-codes to minimal form, which converts a Fibonacci straight p-code into a Fibonacci inverse p-code.

Jet another object of the invention is to provide a data-processing device based on a device for reduction of Fibonacci p-codes to minimal form and comprising an arithmetic unit and an input/output unit intended for handling data represented in Fibonacci p-codes.

A further object of the invention is to provide a summary counter, a subtract counter, and a bidirectional counter for counting Fibonacci p-code pulses, as well as input/output units using these counters.

Another object of the invention is to provide arithmetic units of this digital data-processing device which can perform addition, subtraction, multiplication and division of integers and fractional numbers represented in Fibonacci p-codes.

Still another object of the invention is to provide an arithmetic unit which can control the operation of separate circuitry elements by producing a special error signal.

Yet another object of the invention is to provide a Fibonacci p-number multiplier unit incorporated in said arithmetic unit and featuring faster operation and controllability.

A further object of the invention is to provide a half-adder incorporated in said Fibonacci p-number multiplier unit and intended for handling data represented in Fibonacci p-codes and to provide a test unit which can verify the form of representation of a number by Fibonacci p-codes.

Other features and advantages of the invention will appear from the following description of a preferred embodiment thereof, taken in conjunction with the accompanying drawings.

DESCRIPTION OF THE PREFERRED EMBODIMENTS

Figure 1:
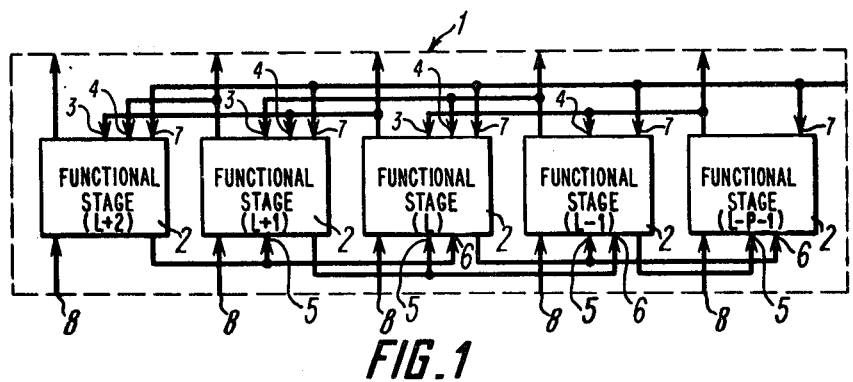
FIG. 1 is a block diagram of a device for reduction of Fibonacci p-codes to minimal form, according to the present invention.

FIG. 1 illustrates an embodiment of a device 1 for reduction of Fibonacci p-codes to minimal form (which will be referred to below as "Fibonacci p-code reduction device 1", for brevity), according to the invention, which operates to reduce Fibonacci p-codes to minimal form when p=1. The Fibonacci p-code reduction device 1 comprises n identical functional stages 2, where n equal to 5 stands for the Fibonacci p-code length. Each functional stage 2 incorporates convolution message inputs 3, 4, convolution set inputs 5, 6, a convolution control input 7, a message output, and a convolution output. The convolution output of an lth functional stage 2(l=3) is coupled to the convolution set input 5 of an (l−1)th functional stage 2 and to the other convolution set input 6 of an (l−p−1)th functional stage 2. The convolution message input 4 of the lth functional stage 2 is coupled to the message output of the (l−1)th functional stage 2, while the convolution message input 3 of the lth functional stage 2 is coupled to the message output of the (l−p−1)th functional stage 2. The message outputs of all functional stages 2 form a single message output of the Fibonacci p-code reduction device 1 which is a multidigit output comprising n digits. The convolution message inputs 3,4 are used to read data from the message outputs of the lth and (l−p−1)th functional stages 2. The convolution control inputs 7 of all functional stages 2 are connected to a common bus which serves as a convolution control input of the Fibonacci p-code reduction device 1, which receives a control signal to initiate the reduction of the Fibonacci p-code, stored in the functional stages 2, to minimal form.

The Fibonacci p-code reduction device 1 has a multidigit message input 8 that accepts binary data conveying a number represented in a Fibonacci p-code.

Figure 2:
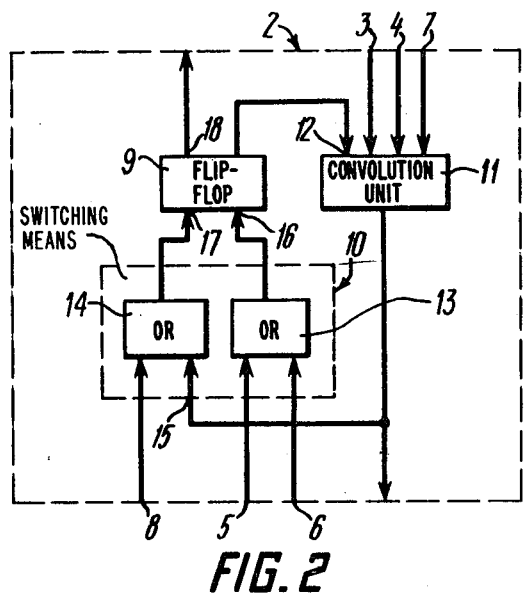
FIG. 2 is a block diagram of a functional stage, according to the present invention.

FIG. 2 illustrates an embodiment of the lth functional stage 2 which comprises a flip-flop 9, a switching unit 10, and a convolution unit 11 built around an AND gate. An input 12 of the AND gate is connected to the "0" output of the flip-flop 9, while the other inputs of the AND gate are the convolution message inputs 3,4 and the convolution control input 7 of the lth functional stage 2.

The convolution unit 11 produces a convolution signal and, with a 1 set in the flip-flop 9, a logic 1 is applied to the convolution message inputs 3,4, and a control signal from the convolution control input of the convolution unit 11 comes to the convolution control input 7. The output of the convolution unit 11 is used as the convolution output of the functional stage 2.

The switching unit 10 comprises an OR gate 13 which accepts the convolution signal to send the flip-flop 9 to a 0 state, that signal being applied to the inputs of the OR gate 13 which serve as the convolution set inputs 5,6 of the functional stage 2, and also comprises an OR gate 14 which enables data to be written in the flip-flop 9 of the lth functional stage 2, obtainable from the message input 8 which is used as an input of the OR gate 14. The other input 15 of the OR gate 14, connected to the output of the AND gate used as the convolution unit 11, is used to set data from the output of the convolution unit 11 of the lth functional stage 12 in the flip-flop 9. The outputs of the OR gates 13, 14 are coupled, respectively, to a "0" set input 16 and a "1" set input 17 of the flip-flop 9. The "1" output of the flip-flop 9 serves as the message output of the functional stage 2.

Figure 3:
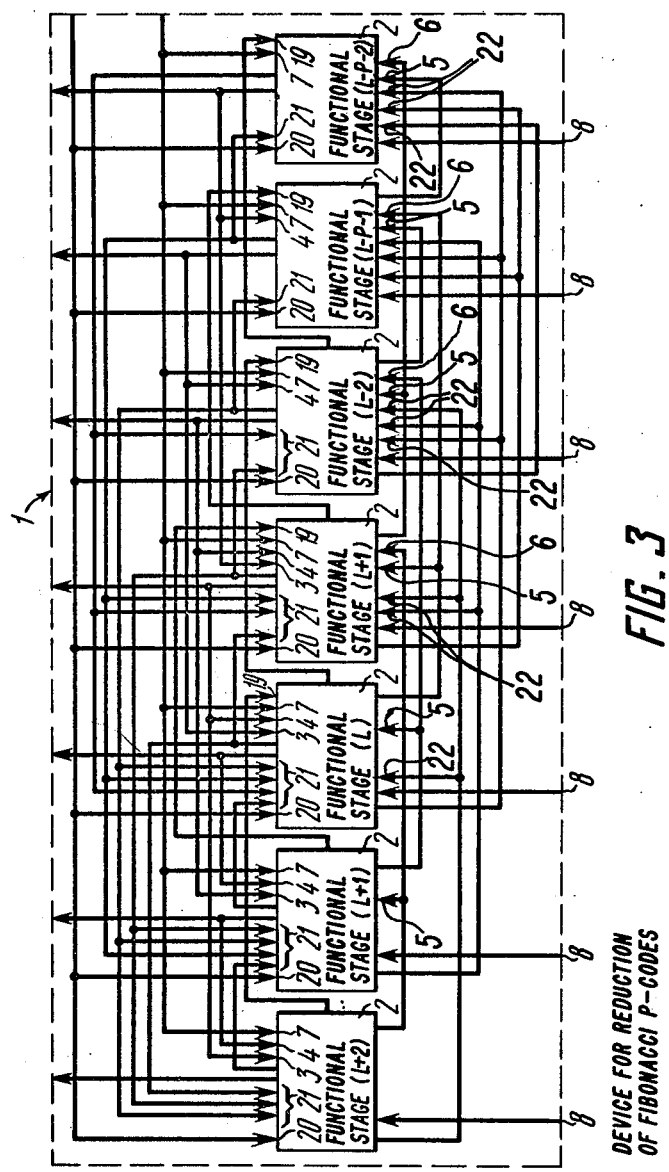
FIG. 3 is a block diagram of a device for reduction of Fibonacci p-codes to minimal form, according to the present invention, wherein each functional stage is provided with devolution inputs and a convolution inhibit input.

FIG. 3 illustrates another embodiment of the Fibonacci p-code reduction device 1 comprising n identical functional stages 2. The lth functional stage 2 is provided with (p−1) convolution inhibit inputs 19 (p=2 and n=7 for the embodiment shown in FIG. 3). The convolution inhibit input 19 of the (l−1)th functional stage 2 is coupled to a convolution inhibit output of the (l+1)th functional stage 2, through which the convolution inhibit signal is applied to an (l−1)th functional stage 2; that signal appears when the convolution signal is present at the convolution output of the lth functional stage 2, connected to the convolution set inputs 5,6 of respective functional stages 2. Each functional stage 2 has a devolution control input 20. The devolution control inputs 20 of all functional stages 2 are coupled to a common bus which constitutes a devolution control input of the Fibonacci p-code reduction device 1. Also, each functional stage 2 is provided with (p+2) devolution message inputs 21, (p+1) devolution set inputs 22, and a devolution output. A first devolution message input 21 of the lth functional stage 2 is coupled to an additional message output of the (l−p)th functional stage 2, which produces a signal accepted by that devolution message input 21 to acknowledge that the flip-flop 9 (FIG. 2) of the lth functional stage 2 assumes a 0 state. Two other devolution message inputs 21 (FIG. 3) of the lth functional stage 2 are coupled, respectively, to additional message outputs of the (l−p−1)th functional stage 2 and an (l−p−2)th functional stage 2, the remaining devolution message input 21 of the lth functional stage 2 being coupled to an additional message output of the (l+1)th functional stage 2. The devolution output of the lth functional stage 2 is connected to one of the devolution set inputs 22 of the functional stages 2(l−p) through (l−p−2). The devolution set inputs 22 are used to send the flip-flops 9 (FIG. 2) of respective functional stages 2 to 1 states.

Figure 4:
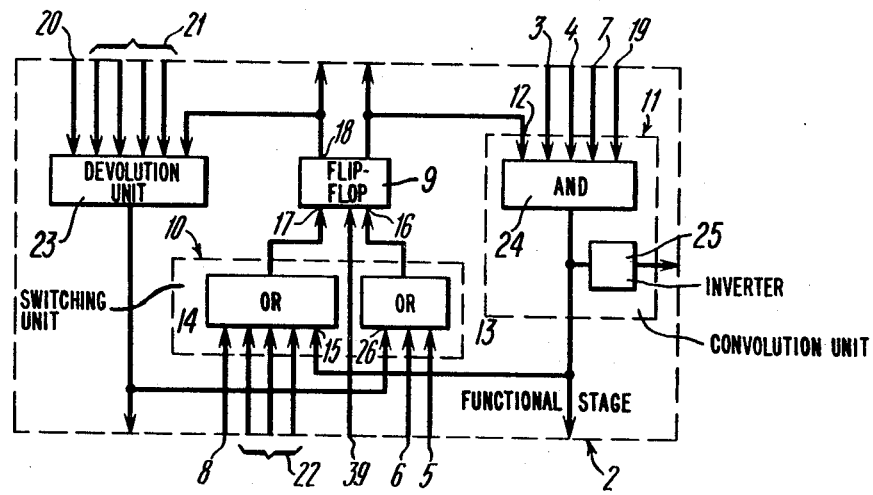
FIG. 4 is a block diagram of a functional stage with a devolution unit, according to the present invention.

FIG. 4 illustrates an embodiment of the functional stage 2 of the Fibonacci p-code reduction device 1 shown in FIG. 3. The functional stage 2 incorporates a devolution unit 23 built around an AND gate having (p+4) inputs. One input of the AND gate is coupled to the "1" output 13 of the flip-flop 9, the other input of the AND gate is the devolution control inputs 20 of the functional stage 2, while the remaining (p+2) inputs of the AND gate constitute the devolution message inputs of the functional stage 2. The output of the AND gate is the output of the devolution unit 23, whereat a logic 1 is present when logic 1's are applied to all inputs of the devolution unit 23. In this embodiment, the convolution unit 11 comprises an AND gate 24 and an inverter 25 connected to the output of the AND gate 24, the output of the inverter 25 being used as the convolution inhibit output of the functional stage 2, which produces the convolution inhibit signal for the convolution units 11 of the functional stages 2(l−1) through (l−p), inclusive. The output of the devolution unit 23 is coupled to an input 26 of the OR gate 13 of the switching unit 10 to deliver a logic 1 to the "0" set input 16 of the flip-flop 9. The devolution set inputs 22 of the functional stage 2 are used as inputs of the OR gate 14.

Figure 5:
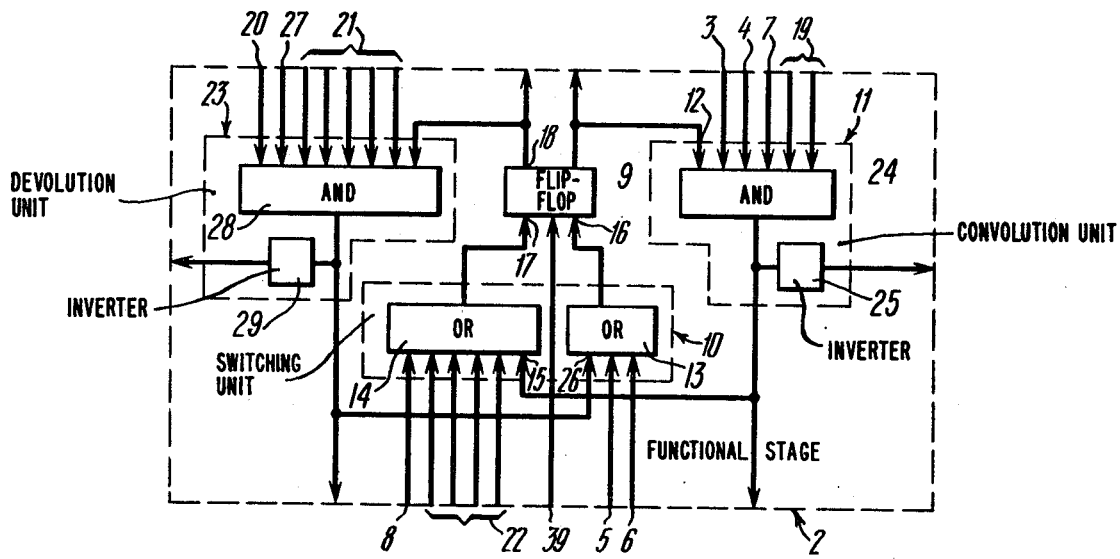
FIG. 5 is a block diagram of a functional stage provided with a devolution inhibit input, according to the present invention.

FIG. 5 illustrates the lth functional stage 2 of the Fibonacci p-code reduction device 1, which comprises (p−2) devolution inhibit inputs 27; in this embodiment, with p=3, each functional stage 2 has one devolution inhibit input 27 which is constituted by an input of an AND gate 28 of the devolution unit 23. The devolution unit 23 comprises an inverter 29 whose input is coupled to the output of the AND gate 28 and whose output serves as a devolution inhibit output of the functional stage 2. The devolution inhibit output of the lth functional stage is coupled to the devolution inhibit inputs of the functional stages 2(l−2) through (l−p−2)th (this connection is not shown in FIG. 5); from that output, the devolution inhibit signal, which is an inverse devolution signal present at the output of the AND gate 28, is applied to the devolution inhibit inputs 27.

Figure 6:
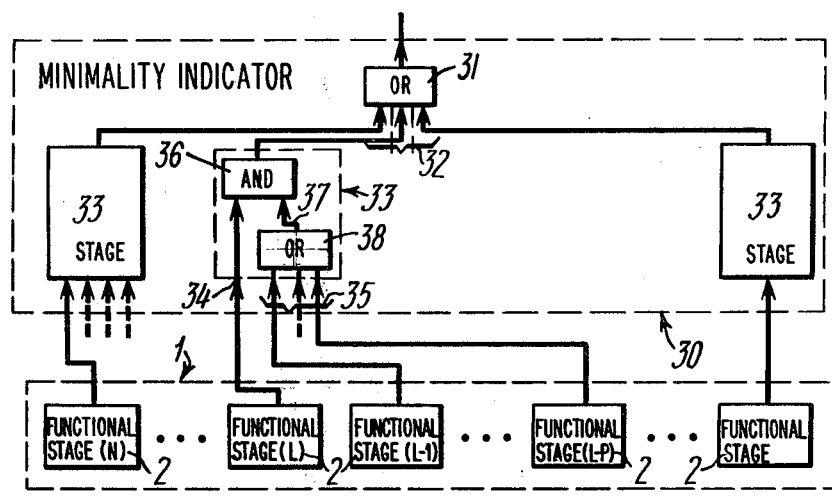
FIG. 6 is a block diagram of a device for reduction Fibonacci p-codes to minimal form, according to the present invention, which comprises a minimality indicator.

FIG. 6 illustrates a Fibonacci p-code reduction device 1 comprising a minimality indicator 30 which determines the minimality of the form of representation of a number in a Fibonacci p-code by producing a respective minimality signal to acknowledge that the Fibonacci p-code has been reduced to minimal form. The minimality indicator 30 is provided with an OR gate 31 having n inputs 32 and with n stages 33. One input 34 of an lth stage 33 is coupled to the message output of the functional stage 2, while the remaining p inputs 35 of the lth stage 33 are coupled to the message outputs of the functional stages 2 (l−1) through (l−p), inclusive, in order to provide for testing the condition of the functional stages 2. Each stage 33 comprises an AND gate 36 whose output is the output of the stage 33 and is coupled to an lth input 32 of the OR gate 31, one input of the AND gate 36 being used as the input 34 of the stage 33, the other input of the AND gate 36 being coupled to an input 37 of an OR gate 38 whose inputs are used to constitute the inputs 35 of the stage 33. The output of the OR gate 31 serves as the output of the minimality indicator 30 to produce the minimality signal delivered to a control unit (not shown in FIG. 6).

The flip-flop 9 (FIG. 4) is provided with a count input used as a complement input 39 of the functional stage 2, which accepts a logic 1 for the flip-flop 9. The complement inputs 39 of the functional stages 21 through (n−p) are coupled to a common bus to form a complement input of the Fibonacci p-code reduction device, connected to a control unit (not shown in FIG. 4).

The features of the Fibonacci p-code reduction device 1 of FIG. 6 also apply to the Fibonacci p-code reduction device 1 of FIG. 5.

Figure 7:
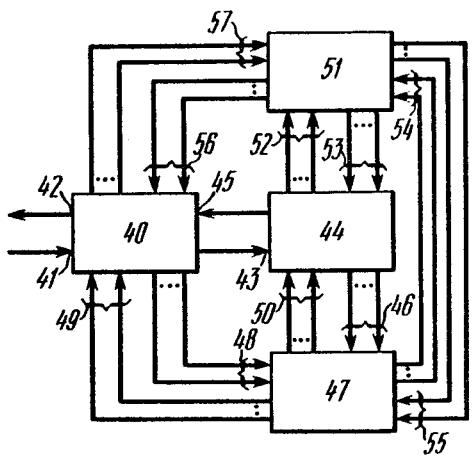
FIG. 7 is a block diagram of a digital data-processing device, according to the present invention, which comprises a Fibonacci p-code minimization unit.

FIG. 7 illustrates a digital data-processing device which comprises an input/output unit 40 provided with a message input 41 and a message output 42 which are designed on a multidigit principle to provide for parallel input/output of multidigit data in the form of a k-ary position code. The input/output unit 40 is used to convert a k-ary position code to a Fibonacci p-code and vice versa. Another message output of the input/output unit 40 is coupled to a message input 43 of an arithmetic unit 44, which is a multidigit input, too. The multidigit message output of the arithmetic unit 44, is connected to a message input 45 of the input/output unit 40.

The multidigit message input 43 of the arithmetic unit 44 and the message input 45 of the input/output unit 40 are intended for data exchange between these units, performed on the basis of a parallel multidigit Fibonacci p-code. A control output group of the arithmetic unit 44 is coupled to an input group 46 of a control unit 47. An input group 48 of the control unit 47 is coupled to a control output group of the input/output unit 40, while two output groups of the control unit 47 are connected to a control input group 49 of the input/output 40 and to a control output group 50 of the arithmetic unit 44. The digital data-processing device also incorporates a Fibonacci p-code minimization unit 51 incorporating at least two Fibonacci p-code reduction devices 1 described with reference to FIGS. 1,3,5.

The Fibonacci p-code minimization unit 51 is provided with an additional message input group 52; each input of that group serves as the multidigit message input of a respective Fibonacci p-code reduction device 1 (FIGS. 1,3,5) formed by the message inputs of the functional stages 2.

The number of the Fibonacci p-code reduction devices 1 that handle data delivered by the arithmetic unit 44 (FIG. 8), and, therefore, the number of the inputs in the additional message input group 52, depend on the functions performed by the arithmetic unit 44 and on the parameter p of the Fibonacci p-code.

Each message input of the additional message input group 52 is coupled to one multidigit output of an additional message output group of the arithmetic unit 44, intended for the output of intermediate data from the arithmetic unit 44 to the Fibonacci p-code minimization unit 51 where the data is reduced to the Fibonacci p-code minimal form.

Each input of the additional message input group 53 of the arithmetic unit 44 is connected to the multidigit message output of one of the Fibonacci p-code reduction devices 1 of FIGS. 1, 3.

The additional message input group 53 (FIG. 7) provides for transfer of an intermediate minimized data from the Fibonacci p-code minimization unit 51 to the arithmetic unit 44. A control input group 54 of the Fibonacci p-code minimization unit 51 is coupled to an additional input group 55 of the control unit 47. The control input group 54 of the Fibonacci p-code minimization unit 51 comprises the convolution control inputs 7 (FIG. 3), the devolution control inputs 23 and the complement inputs 39 (FIG. 4) of the functional stages 2 of the Fibonacci p-code reduction devices 1. An output control group of the Fibonacci p-code minimization unit 51 is formed by the outputs of the minimality indicators 30 (FIG. 6) and provides for an asynchronous operating mode. The Fibonacci p-code minimization unit 51 incorporates an additional message output group provided with multidigit outputs and coupled to an additional message input group 56 of the input/output unit 40 and also incorporates an additional message input group 57 coupled to an additional message output group of the input/output unit 40. In this embodiment, the Fibonacci p-code minimization unit 51 comprises additional Fibonacci p-code reduction devices 1 similar to those of FIGS. 1, 3, 5, 7. The number of said additional Fibonacci p-code reduction devices 1 is determined by the parameter p; each output of the additional message output group of the Fibonacci p-code minimization unit 51 is the message output of one of the additional Fibonacci p-code reduction devices 1, while each input of the additional message input group 57 of the Fibonacci p-code minimization unit 51 is the message input of one of the additional Fibonacci p-code reduction devices 1.

The additional message input group 57 and the additional message output group of the Fibonacci p-code minimization unit 51 are used, respectively, to receive intermediate Fibonacci p-code data from the input/output unit 40, to be reduced to the minimal form of representation, and to output the minimized intermediate data from the Fibonacci p-code minimization unit 51 to the input/output unit 40.

Figure 8:
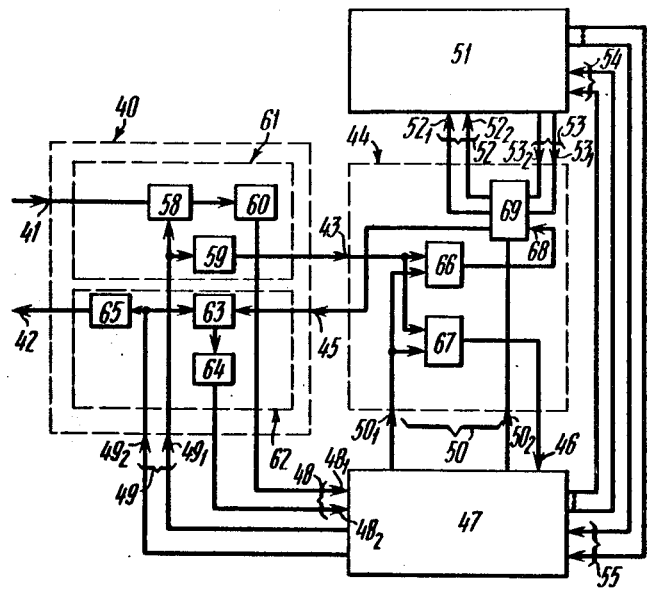
FIG. 8 is a block diagram of arithmetic and input/output units, according to the present invention.

FIG. 8 illustrates block diagrams of the arithmetic unit 44 and the input/output unit 40 which perform operations on Fibonacci p-code data. The input/output unit 40 comprises a k-ary subtract pulse counter 58, a Fibonacci p-code summary pulse counter 59, and a zero detector 60 which form, all together, a k-ary position code-to-Fibonacci p-code converter 61. The message input 41 of the input/output unit 40 is the message input of the k-ary subtract pulse counter 58, a first input $49_1$ of the control input group 49 being coupled to the count input of the k-ary subtract pulse counter 58 and to the count input of the Fibonacci p-code summary pulse counter 59.

The output of the Fibonacci p-code summary counter 59 is the message output of the input/output unit 40 connected to the message input 43 of the arithmetic unit 44, while the output of the k-ary subtract pulse counter 58 is coupled to the input of the zero detector 60 whose output produces a naught signal acknowledging that the k-ary subtract pulse counter 58 assumes a 0 state and that the conversion of the k-ary position code previously stored in said counter to a Fibonacci p-code is thus completed. The output of the zero detector 60 is an output of the control output group of the input/output unit 40, coupled to an input $48_1$ of the input group 48 of the control unit 47. The input/output unit 40 also comprises a Fibonacci p-code-to-k-ary position code converter 62 incorporating a Fibonacci p-code subtract pulse counter 63, a zero detector 64, and a k-ary summary pulse counter 65. The message input 45 of the input/output unit 40 is the message input of the Fibonacci p-code subtract pulse counter 63 whose output is coupled to the input of the zero detector 64 whose output is an output of the control output group of the input/output unit 40, connected to an input $48_2$ of the control output group 48 of the control unit 47. An input $49_2$ of the control input group 49 of the input/output unit 40 is coupled to the count input of the k-ary summary pulse counter 65 and to the count input of the Fibonacci p-code subtract pulse counter 63. The output of the k-ary summary counter 65 is the message output 42 of the input/output unit 40.

The message input 43 of the arithmetic unit 44 is coupled to message inputs of a multiplicand register 66 and a factor register 67 which are used to store and shift Fibonacci p-code data and which are provided with shift-of-one-position control inputs connected to an input $50_1$ of the control input group 50. The output of the multiplicand register 66 is coupled to an addend input 68 of a Fibonacci p-code adder 69. The intermediate sum input and the intermediate carry input of the Fibonacci p-code adder 69 serve, respectively, as an input $53_1$ and an input $53_2$ of the additional message input group 53 of the arithmetic unit 44. The intermediate sum output and the intermediate carry output of the Fibonacci p-code adder 69 are used as outputs of the additional message output group of the arithmetic unit 44 connected, respectively, to inputs $52_1$, $52_2$ of the additional message group 52. The message output of the arithmetic unit 44 connected with the message input 45 of the input/output unit 40 is the message output of the Fibonacci p-code adder 69, while the output of an extreme position of the factor register 67 is a single output coupled to a single input of the input group 46 of the control unit 47. An input $50_2$ of the control input group 50 of the arithmetic unit 44 is the control input of the Fibonacci p-code adder 69 which is used to accumulate partial products and to produce the final result of multiplication.

Figure 9:
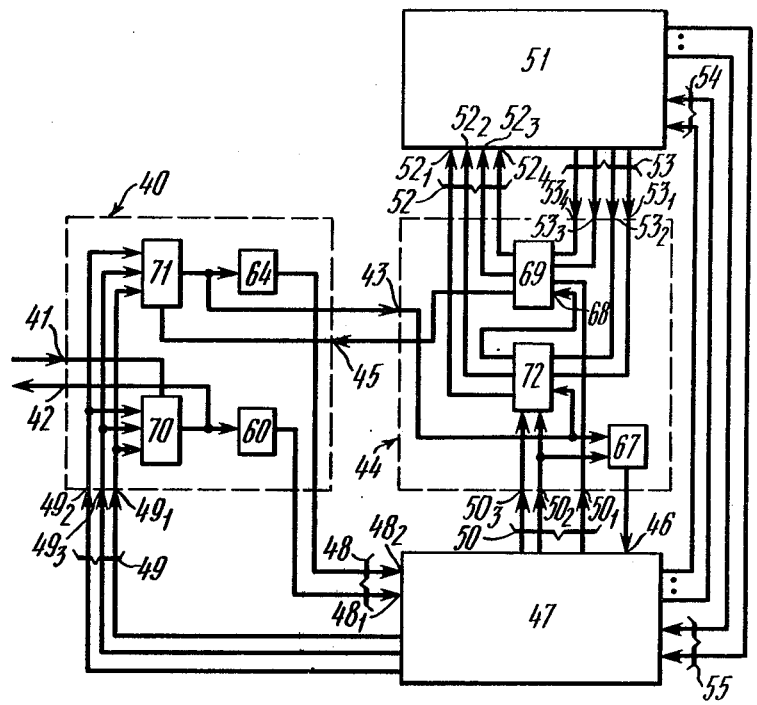
FIG. 9 is a block diagram of an arithmetic unit which performs multiplication and an input/output unit which comprises a k-ary bidirectional pulse counter and a Fibonacci p-code bidirectional pulse counter, according to the present invention.

FIG. 9 represents block diagrams of other embodiments of the input/output unit 40 and the arithmetic unit 44. The input/output unit 40 comprises a k-ary bidirectional pulse counter 70, a Fibonacci p-code bidirectional pulse counter 71 and zero detectors 60, 64 which operate all together to perform the functions of the k-ary position code-to-Fibonacci p-code converter 61 and the Fibonacci p-code-to-k-ary position code converter 62 depending on the control signals transferred from the control unit 47 to the control inputs of the k-ary bidirectional pulse counter 70 and the Fibonacci p-code bidirectional pulse counter 71 whose count inputs are coupled to the input $49_1$ of the control input group of the input/output unit 40. The subtract control input of the Fibonacci p-code bidirectional pulse counter 71 and the add control input of the k-ary bidirectional pulse counter 70 are coupled to the input $49_2$ of the control input group 49 of the input/output unit 40, whereas the add control input of the Fibonacci p-code bidirectional pulse counter 71 and the subtract control input of the k-ary bidirectional pulse counter 70 are coupled to an input $49_3$ of the control input group 49 of the input/output unit 40. The message input of the k-ary bidirectional pulse counter 70 is the message input 41 of the input/output unit 40, while the message output of the k-ary bidirectional pulse counter 70 is connected to the input of the zero detector 60 to constitute the message output 42 of the input/output unit 40. The message input 45 of the input/output unit 40 is the message input of the Fibonacci p-code bidirectional pulse counter 71 whose output is coupled to the input of the zero detector 64 to constitute the message output of the input/output unit 40, connected to the message input 43 of the arithmetic unit 44. The outputs of the zero detectors 60, 64 are used as outputs of the control output group of the input/output unit 40, coupled, respectively, to the inputs $48_1$, $48_2$ of the control input group 48 of the control unit 47. The arithmetic unit 44 comprises the factor register 67, the Fibonacci p-code adder 69, and a Fibonacci p-number multiplier unit 72 which are used to perform multiplication of numbers represented by Fibonacci p-codes. The message input 43 is coupled to the message input of the factor register 67 and to the message input of the Fibonacci p-number multiplier unit 72 whose output is coupled to the addend input 68 of the Fibonacci p-code adder 69 whose message output is the message output of the arithmetic unit 44, coupled to the message input 45 of the input/output unit 40. The inputs $50_1$, $50_3$ of the control input group 50 of the arithmetic unit 44 are used, respectively, as the control inputs of the Fibonacci p-code adder 69 and the Fibonacci p-number multiplier unit 72, whereas the input $50_2$ of the control input group 50 is coupled to the control input of the factor register 67 and to the other control input of the Fibonacci p-number multiplier unit 72. The output of the low-order position of the factor register 67 is a single output of the control output group of the arithmetic unit 44, coupled to the input 46 of the control unit 47. The intermediate sum input and the intermediate carry input of the Fibonacci p-number multiplier unit 72 are used, respectively, as the inputs $53_1$, $53_2$ of the additional message input group 53 of the arithmetic unit 44, while the intermediate sum input and the intermediate carry input of the Fibonacci p-code adder 69 are used, respectively, as inputs $53_3$, $53_4$ of the additional message input group 53. The intermediate sum output and the intermediate carry output of the Fibonacci p-number multiplier unit 72 constitute outputs of the output group of the arithmetic unit 44, coupled, respectively, to the inputs $52_1$, $52_2$ of the additional message input group 52 of the Fibonacci p-code minimization unit 51, whereas the intermediate sum output and the intermediate carry output of the Fibonacci p-code adder 69 serve as the other outputs of the output group of the arithmetic unit 44, coupled, respectively, to inputs $52_3$, $52_4$ of the additional message input group 52 of the Fibonacci p-code minimization unit 51.

Figure 10:
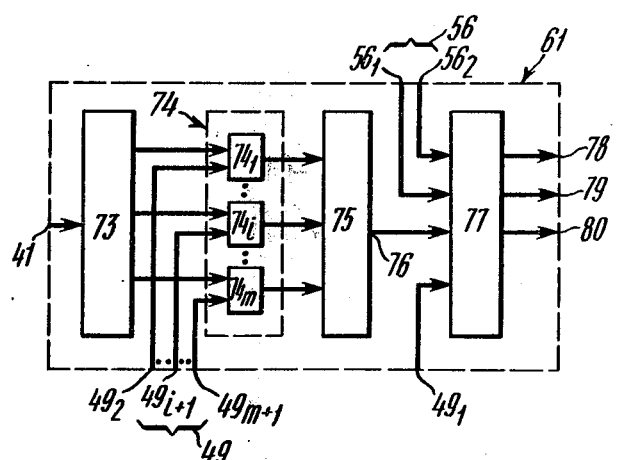
FIG. 10 is a block diagram of a k-aryl position code-to-Fibonacci p-code converter of the input/output unit, according to the present invention.

FIG. 10 is a block diagram of the k-ary position code-to-Fibonacci p-code converter 61 of the input/output unit 40, wherein the message input 41 of the input/output unit 40 serves as the message input of a register 73 provided with m outputs coupled, respectively, to inputs of AND gates $74_1$ through $74_m$ of an AND gate unit 74, where m is the original k-ary position code length. The other input of each AND gate $74_i$ serves as an input $49_{i+1}$ of the control input group 49 of the input/output unit 40. An OR gate unit 75 of the input/output unit 40 comprises n OR gates (not shown in FIG. 10), where n is the Fibonacci p-code length. The output of an AND gate $74_i$ is coupled to an input of that OR gate of the OR gate unit 75, whose number coincides with the number of the digit given a 1 value for the number $a_i k^i$ represented in the Fibonacci minimal p-code, where $a_i$ is the value of the ith digit and k is the radix of the number system. The AND gate unit 74 and the OR gate unit 75 are used to convert the ith digit of the original k-ary position code stored in the register 73 to a Fibonacci p-code on arrival of the control signal at the input $49_{i+1}$ of the control input group 49. An output 76 of the OR gate unit 75, which is a multidigit output, is coupled to the multidigit input of a Fibonacci p-code adder 77 whose control input is the input $49_1$ of the control input group 49 and whose intermediate sum input and intermediate carry input are used, respectively, as inputs $56_1$, $56_2$ of the additional message input group 56. An intermediate sum output 78 and an intermediate carry output 79 of the Fibonacci p-code adder 77 serve as outputs of the output group of the input/output unit 40, coupled, respectively, to an input $57_1$ and an input $57_2$ of the additional message input group 57 (FIG. 2) of the Fibonacci p-code minimization unit 51. A message output 80 (FIG. 10) of the Fibonacci p-code adder 77 is the message output of the input/output unit 40, connected to the message input 43 (FIG. 1) of the arithmetic unit 44.

The Fibonacci p-code adder 77 is used to accumulate Fibonacci p-codes obtainable from the outputs of the OR gates of the OR gate unit 75 so that the final result of the k-ary position code-to-Fibonacci p-code conversion is obtained.

Figure 11:
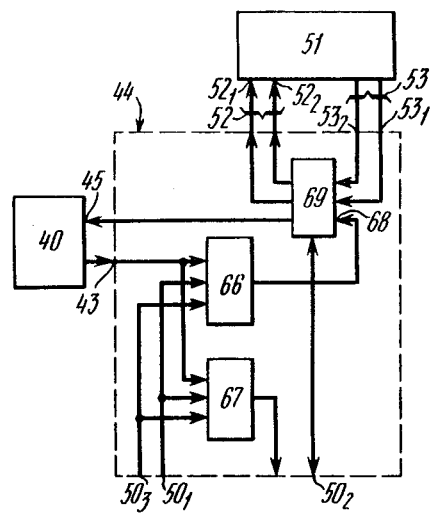
FIG. 11 is a block diagram of an arithmetic unit, according to the present invention, which comprises multiplicand and factor registers provided with shift-of-(p+1)-position inputs.

FIG. 11 is a block diagram of an embodiment of the arithmetic unit 44, which basically resembles the embodiment of the arithmetic unit 44 of FIG. 10. The arithmetic unit 44 shown in FIG. 11 incorporates the input $50_3$ of the control input group 50, coupled to the shift-of-(p+1)-position control inputs of the multiplicand register 66 and the factor register 67. Such an embodiment allows for faster multiplication of two numbers represented by Fibonacci p-codes, since shift time is reduced due to the fact that a given code is shifted by (p+1) positions at a time provided that a preceding digit of the factor is equal to a 1.

Figure 12:
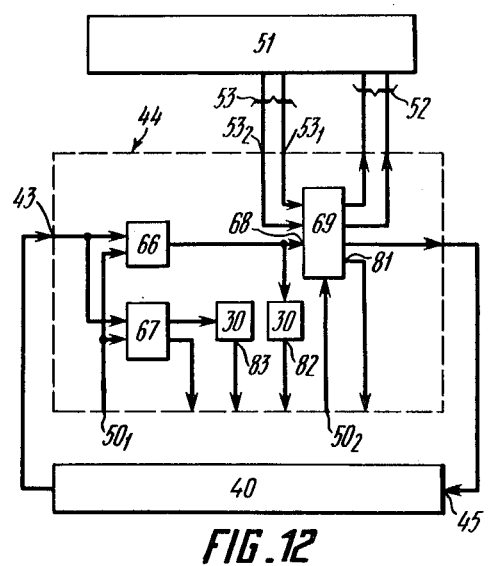
FIG. 12 is a block diagram of an arithmetic unit, according to the present invention, which comprises two minimality indicators.

FIG. 12 is a block diagram of another embodiment of the arithmetic unit 44 which is provided in contrast to the embodiment of FIG. 8, with three control outputs of its control output group, coupled to the input group 46 (FIG. 10) of the control unit 47. One of said control outputs is a check output 81 (FIG. 12) of the Fibonacci p-code adder 69, another control output is an output 82 of one minimality indicator 30 of FIG. 6 having its input connected to the message output of the multiplicand register 66, while a third control input of the arithmetic unit 44 is an output 83 of the other minimality indicator 30 whose input is coupled to the message output of the factor register 67. The two minimality indicators 30 are used to produce error signals to be delivered to the control unit 47 (FIG. 8) when the form of a number stored in the multiplicand register 66 and in the factor register 67 does not correspond to the minimal form of representation of the number of Fibonacci p-codes. The check output 81 of the Fibonacci p-code adder 69 generates an error signal in the case of improper operation of the Fibonacci p-code adder 69. The features of the arithmetic unit 44 of FIG. 12 also apply to the arithmetic unit 44 of FIG. 13.

Figure 13:
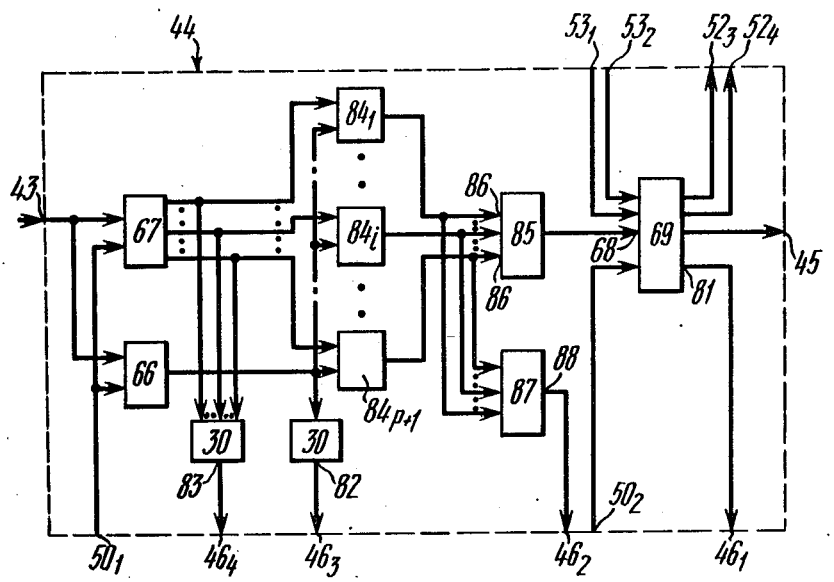
FIG. 13 is a block diagram of an arithmetic unit which comprises minimality indicators, according to the present invention.

FIG. 13 illustrates still another embodiment of the arithmetic unit 44 which performs multiplication. In this embodiment, the arithmetic unit 44 comprises a multiplicand register 66, a factor register 67, a Fibonacci p-code adder 69, AND gate units $84_1$ through $84_{p+1}$, and an OR gate unit 85. The message input 43 of the arithmetic unit 44 is coupled to the message inputs of the multiplicand register 66 and the factor register 67; the shift-of-(p+1)-position control inputs of said registers are interconnected and constitute the input $50_1$ of the control input group 50 of the arithmetic unit 44. The message output of the multiplicand register 66 is a multidigit one and is connected to the multidigit inputs of all AND gate units 84; note that the number of inputs of the multidigit unit of any AND gate unit $84_i$ is equal in number to its AND gates, each lth input of the multidigit input being used as an input of an lth AND gate of the AND gate unit $84_i$.

In addition, said input of the lth AND gate of the AND gate $84_i$ is coupled to an (l+1)th output of the multidigit message output of the multiplicand register 66. The output of an (n−i)th digit of the factor register 67 is coupled to the other inputs of all AND gates of the AND gate unit $84_i$. The multidigit outputs of the AND gate units 84 are coupled to inputs 86 of the OR gate units 85, the outputs of the lth AND gates of all AND gate units 84 being coupled to (p+1)th inputs of an lth OR gate of the OR gate unit 85 (not shown in FIG. 13). The AND gate units 84 and the OR gate unit 85 are designed to perform, concurrently, the multiplication of all digits of the multiplicand by a (p+1)th digit of the factor. The multidigit output of the OR gate unit 85 is coupled to the addend input 68 of the Fibonacci p-code adder 69 intended for the accumulation of partial products according to a signal applied to the input $50_2$ which is the control input of the Fibonacci p-code adder 69. The latter is provided with the check output 81 which is an output of the control output group of the arithmetic unit 44. The outputs of the multiplicand register 66 and the factor register 67 are coupled to respective minimality indicators 30 whose outputs serve as outputs of the control output group of the arithmetic unit 44. There is also provided a test unit 87 whose inputs are connected to the multidigit outputs of the AND gate units 84 and whose output 88 is an output of the control output group of the arithmetic unit 44, which allows partial products to be verified by generating an error signal corresponding to a condition in which more than one AND gate unit 84 produce, at their outputs, a code differing from a zero code.

Figure 14:
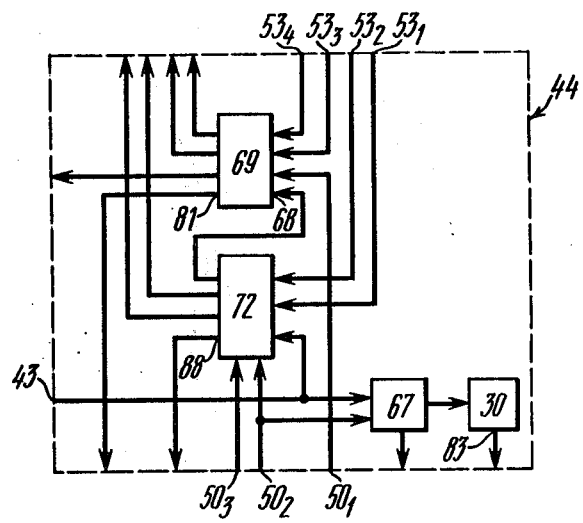
FIG. 14 is a block diagram of an arithmetic unit, which comprises a Fibonacci p-number multiplier unit, according to the present invention.

FIG. 14 is a block diagram of yet another embodiment of the arithmetic unit 44 which basically resembles that of FIG. 9. In this embodiment, the Fibonacci p-code adder 69 and the Fibonacci p-number multiplier unit 72 are provided, respectively, with check outputs 81 and 89 which are used as outputs of the control output group of the arithmetic unit 44, coupled to the input group 46 (FIG. 8) of the control unit 47, which allows for control of the Fibonacci p-number multiplication performed in the Fibonacci p-number multiplier unit 72 and for control of accumulation of partial products in the Fibonacci p-code adder 69. In addition, the arithmetic unit 44 is provided with a minimality indicator 30 whose input is coupled to the message output of the factor register 67, while the output 83 of the minimality indicator 30 serves as an output of the control output group of the arithmetic unit 44, which allows for control of conditions under which codes are stored and shifted in the factor register 67.

Figure 15:
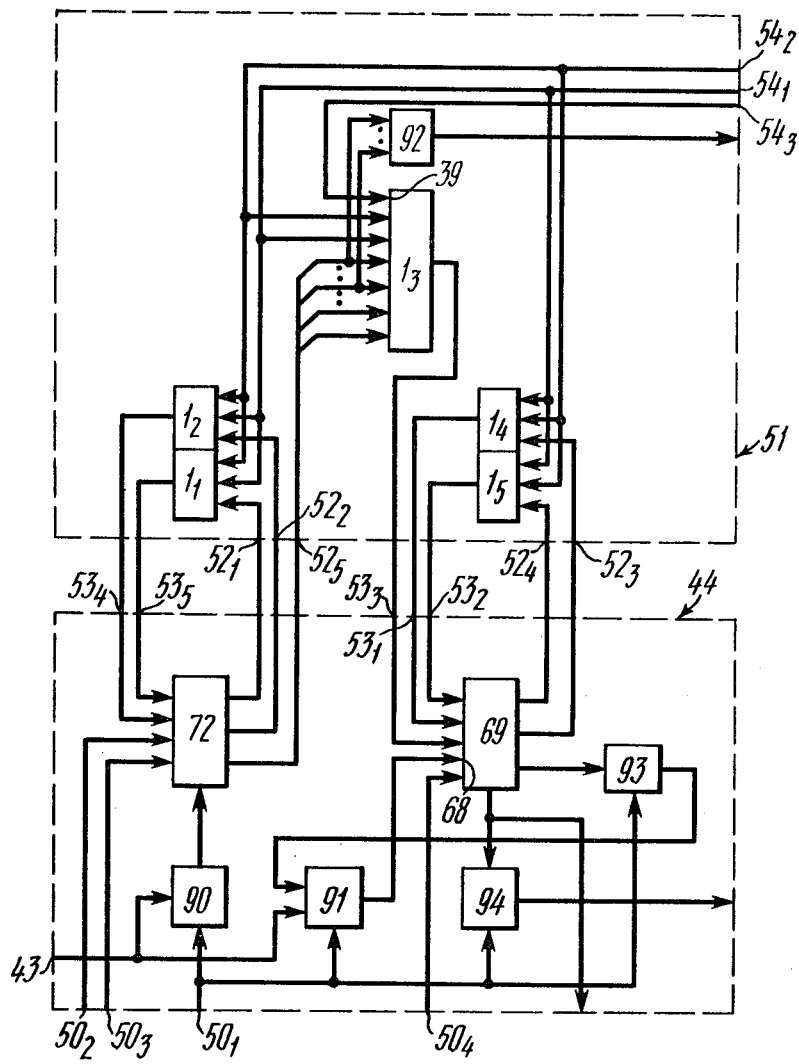
FIG. 15 is a block diagram of an arithmetic unit which performs division and a Fibonacci p-code minimization unit, according to the present invention.

FIG. 15 is a block diagram of the arithmetic unit 44 which performs the division of numbers represented in Fibonacci p-codes. The message input 43 of the arithmetic unit 44 is coupled to the message input of a divisor register 90 and to an input of a dividend register 91. The message output of the divisor register 90 is coupled to the input of the Fibonacci p-number multiplier unit 72. The intermediate sum output and the intermediate carry output of the Fibonacci p-number multiplier unit 72, which serve as outputs of the additional message output group of the arithmetic unit 44 connected, respectively, to the inputs $52_1$, $52_2$ of the additional message input group 52 of the Fibonacci p-code minimization unit 51, are coupled, respectively, to the Fibonacci p-code reduction devices $1_1$ and $1_2$, while the message output of the Fibonacci p-number multiplier unit 72, which is a multidigit output, is connected to the input $52_3$ which is the message input of the Fibonacci p-code minimal form reduction device $1_3$ of FIG. 5, intended for the straight-to-inverse code conversion performed during subtraction. In addition, p high-order positions of the multidigit message output of the Fibonacci p-number multiplier unit 72 are coupled to respective inputs of an OR gate 92. The input $53_4$ and an input $53_5$ serve as the intermediate sum input and the intermediate carry input, respectively, of the Fibonacci p-number multiplier unit 72 and are coupled to the message outputs of the Fibonacci p-code reduction devices $1_2$ and $1_1$. The output of the OR gate 92 is used as an output of the control output group of the Fibonacci p-code minimization unit 51, coupled to the additional message input group 56 of the input/output unit 40 (FIG. 7). The output of the Fibonacci p-code reduction device $1_3$ is coupled to the input $53_3$ of the arithmetic unit 44; the input $53_3$ is used as an addend input of the Fibonacci p-code adder 69 whose intermediate sum and intermediate carry outputs are used, respectively, as the inputs $53_1$, $53_2$ of the arithmetic unit 44 and are connected to the message outputs of the Fibonacci p-code reduction devices $1_4$, $1_5$ of the Fibonacci minimization unit 51, whereas the intermediate sum and the intermediate carry output of the Fibonacci p-code adder 69 are coupled to the inputs $52_3$, $52_4$ of the Fibonacci p-code minimization unit 51 and to the message inputs of the Fibonacci p-code reduction devices $1_4$, $1_5$. The convolution message inputs 21 and the convolution control inputs 7 of the functional stages 2 of all Fibonacci p-code minimal form reduction devices $1_1$ through $1_5$ are interconnected and constitute inputs $54_1$, $54_2$ of the control input group 54 of the Fibonacci p-code minimization unit 51. The complement input of the Fibonacci p-code reduction device $1_3$ is an input $54_3$ of the control input group 54 of the Fibonacci p-code minimization unit 51. The message output of the Fibonacci p-code adder 69 is coupled to the message input of an additional register 93 whose message output is coupled to the other message input of the dividend register 91 having its output connected the addend input 8 of the Fibonacci p-code adder 69. The carry output of the high-order position of the Fibonacci p-code adder 69 is coupled to the message input of a quotient register 94. The message output of the quotient register 94 serves as the message output of the arithmetic unit 44, coupled to the message input 45 (FIG. 1) of the input/output unit 40. The input $50_1$ (FIG. 15) of the control input group 50 of the arithmetic unit 44 is coupled to the control inputs of the divisor register 90, the dividend register 91, the quotient register 94, and the additional register 93. A control input of the Fibonacci p-number multiplier unit 72 is used as the input $50_2$ and the other control input of said unit is the input $50_3$ of the control input group 50 of the arithmetic unit 44. The control input of the Fibonacci p-code adder 69 is an input $50_4$ of the control input group 50 of the arithmetic unit 44.

Figure 16:
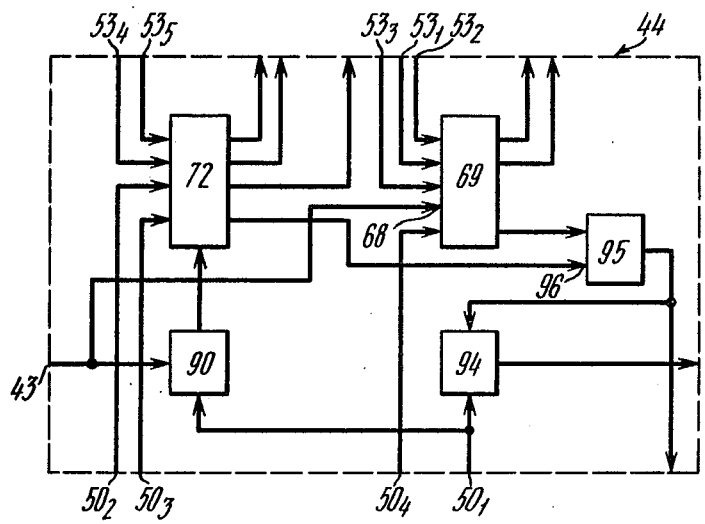
FIG. 16 is a block diagram of another embodiment of an arithmetic unit which performs division, according to the present invention.

FIG. 16 is a block diagram of another embodiment of the arithmetic unit 44 which performs division of numbers represented in Fibonacci p-codes. As compared to the embodiment of FIG. 15, the dividend register 91 (FIG. 15) and the additional register 93 are not present in this case, but a code comparison unit 95 is available which serves to compare a signal applied to its input 96 from an additional message output of the Fibonacci p-number multiplier unit 72 (the signal represents the product of the divisor and a given Fibonacci p-number) with a signal that appears at the message output of the Fibonacci p-code adder 69 to represent the value of a remainder obtained during division of the dividend, delivered from the message input 43 to the addend input 68 of the Fibonacci p-code adder 69, by the divisor set in the divisor register 90. The output of the code comparison unit 95 is coupled to the input of the quotient register 94 and to an output of the control output group 45 of the arithmetic unit 44, coupled to the input $46_1$ (FIG. 7) of the input group 46 of the control unit 47. The latter has an output connected to the input $50_4$ (FIG. 16) of the control input group 50 of the arithmetic unit 44 to produce control signals for the Fibonacci p-code adder 69.

Figure 17:
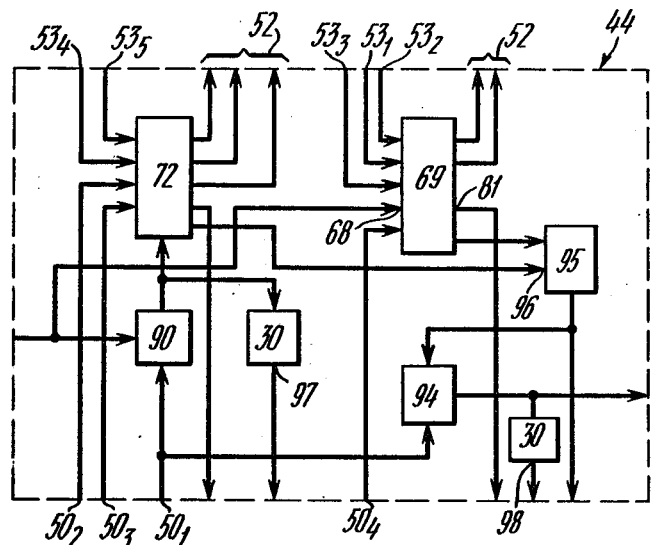
FIG. 17 is a block diagram of an arithmetic unit provided with a code comparison unit, according to the present invention.

FIG. 17 is a block diagram of still another embodiment of the arithmetic unit 44 which performs division. The arithmetic unit 44 comprises two minimality indicators 30 whose inputs are coupled to the message outputs of the dividend register 90 and the quotient register 94, whereas outputs 97, 98 of the minimality indicators 30 are used as outputs of the control output group of the arithmetic unit 44, a feature that allows for control of conditions under which codes are stored in the divisor register 90 and the quotient register 94. The Fibonacci p-number multiplier unit 72 and the Fibonacci p-code adder 69 are provided, respectively, with the check outputs 89, 81 which serve as outputs of the control output group of the arithmetic unit 44, said outputs being connected to inputs of the input group 46 (FIG. 7) of the control unit 47. The check outputs 81, 89 make it possible to detect errors which may occur during operation of the Fibonacci p-code adder 69 and the Fibonacci p-number multiplier unit 72.

Figure 18:
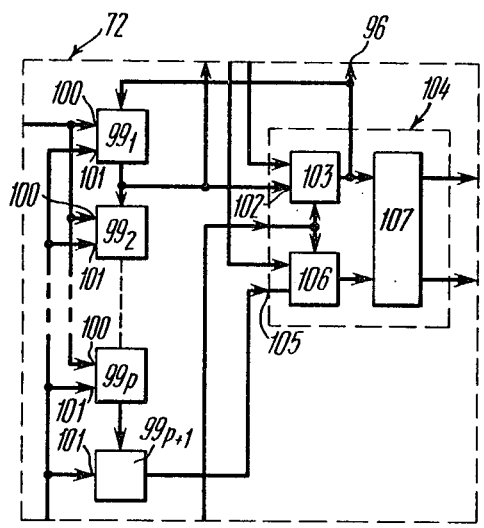
FIG. 18 is a block diagram of a Fibonacci p-number multiplier unit, according to the present invention.

FIG. 18 is a block diagram of an embodiment of the Fibonacci p-number multiplier unit 72 which comprises $(p+1)$ series-connected registers $99_1$ through $99_{p+1}$ designed to store $(p+1)$ products obtained by multiplying numbers in terms of Fibonacci p-codes by Fibonacci p-numbers. Message inputs 100 of the registers $99_1$ through $99_{p+1}$ are interconnected and form the message input of the Fibonacci p-number multiplier unit 72. Control inputs 101 of all registers 99 are interconnected to form a control input of the Fibonacci p-number multiplier unit 72, coupled to the input $50_2$ (FIG. 17) of the arithmetic unit 44. The message output of a register $99_1$ is coupled to an input 102 of a register 103 of a Fibonacci p-code adder 104, said output constituting the additional message output of the Fibonacci p-number multiplier unit 72; the message output of a register $99_{p+1}$ is coupled to a second addend input 105 of the Fibonacci p-code adder 104, said input being used as one of the message inputs of a register 106. The other message input of the register 106 and the other message input of the register 103 serve, respectively, as the intermediate sum input and the intermediate carry input of the Fibonacci p-number multiplier unit 72, coupled to the inputs $53_4$, $53_5$ (FIG. 7) of the arithmetic unit 44.

The control inputs of the registers 103, 106 (FIG. 18) are interconnected and coupled to the other control input of the Fibonacci p-number multiplier unit 72, which is the input $50_3$ of the control input group 50 of the arithmetic unit 44. The outputs of the registers 103, 106 are coupled to the inputs of an n-digit half-adder 107 which has its intermediate sum output and its intermediate carry output connected, respectively, to the intermediate sum output and the intermediate carry output of the unit 72. The output of the register 103 is also coupled to the other message input of the register $99_1$ and is used as the message output of the Fibonacci p-number multiplier unit 72.

Figure 19:
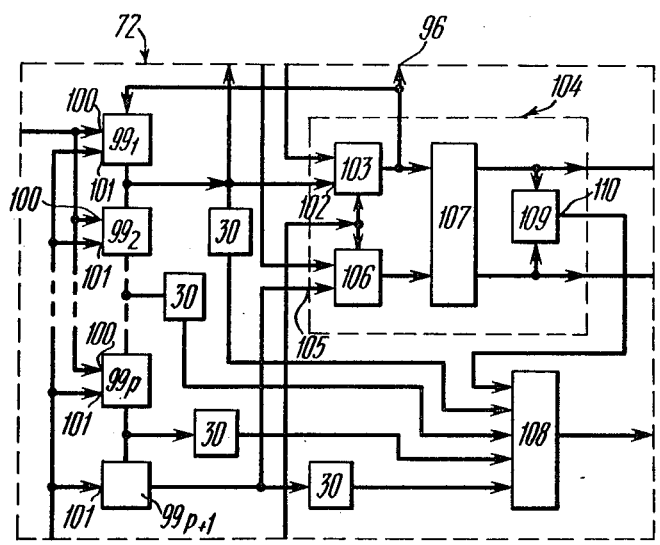
FIG. 19 is a block diagram of a Fibonacci p-number multiplier unit provided with minimality indicators and an OR gate, according to the present invention.

FIG. 19 represents a block diagram of another embodiment of the Fibonacci p-number multiplier unit 72, basically similar to that shown in FIG. 18. In this embodiment, the Fibonacci p-number multiplier unit 72 (FIG. 19) comprises $(p+1)$ minimality indicators 30 whose inputs are connected to message outputs of the registers $99_1$ through $99_{p+1}$ and whose outputs are connected to inputs of an OR gate 108. Moreover, there is provided a test unit 109 for the n-digit half-adder 107, which has its inputs coupled to the intermediate sum output and the intermediate carry output of the n-digit half-adder 107 and has its output used as a check output 110 of the Fibonacci p-code adder 104, which produces an error signal in the case of improper operation of the n-digit half-adder 107. The check output 110 is coupled to the remaining input of the OR gate 108 whose output serves as the check output 89 of the Fibonacci p-number multiplier unit 72. The Fibonacci p-code adder 104 can also be used as the Fibonacci p-code adder 69 (FIG. 17) of the arithmetic unit 44. In this case, the check output 110 (FIG. 19) serves as the check output 81 of the Fibonacci p-code adder 69.

Figure 20:
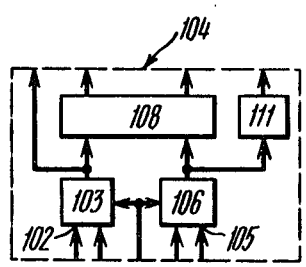
FIG. 20 is a Fibonacci p-code adder with a zero detector, according to the present invention.

As compared to the embodiment of the Fibonacci p-code adder 104, shown in FIG. 18, that illustrated by FIG. 20 comprises a zero detector 111 coupled to the output of the register 106; this provides for faster operation of the Fibonacci p-code adder 104, since asynchronous operating mode is attained in which the completion of the carry operation can be determined.

Figure 21:
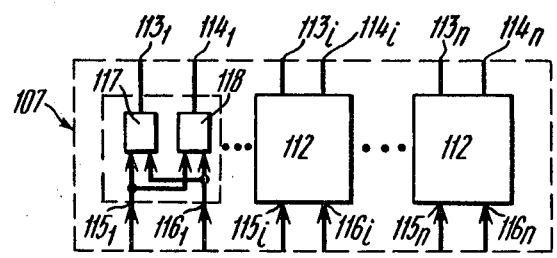
FIG. 21 is a block diagram of an n-digit half-adder, according to the present invention.

FIG. 21 is a block diagram of the n-digit half-adder 107 which is incorporated in the Fibonacci p-code adders 69 (FIGS. 14–17) and in the Fibonacci p-code adders 104 (FIGS. 18, 19) and comprises n stages (where n is the Fibonacci p-code length) isolated from each other. Outputs $113_1 \ldots 113_i \ldots 113_n$ of all stages 112 form the multidigit sum output of the n-digit half-adder 107, which is the intermediate sum output of the Fibonacci p-number multiplier unit 72 (FIG. 19). Outputs $114_1 \ldots 114_i \ldots 114_n$ of stages 112 (FIG. 21) form the multidigit carry output of the n-digit half-adder 107, which is the intermediate carry output of the Fibonacci p-code p-number multiplier unit 72 (FIG. 19). Outputs $115_1 \ldots 115_i \ldots 115_n$ of all stages 112 form a first multidigit addend input of the Fibonacci p-code half-adder 107 coupled to the output of the register 103, while inputs $116_1 \ldots 116_i \ldots 116_n$ of said adder constitute its second multidigit addend input.

Each stage 112 comprises an OR gate 117 that produces a sum signal and an AND gate 118 that produces a carry signal; some inputs of the OR gate 117 and the AND gate 118 are coupled to a common point that constitutes an input 115, while the other inputs of said gates are coupled to form an input 116, and inputs $116_1 \ldots 116_i \ldots 116_n$ of all stages 112 form the second addend input of the n-digit half-adder 107 (FIG. 22) coupled to the output of the register 106. The outputs of the OR gate 117 and the AND gate 118 are used, respectively, as an input 113 and an input 114 of the n-digit half-adder 107. This embodiment of the n-digit half-adder 107 is employed to sum up identical digits represented in Fibonacci p-codes.

Figure 22:
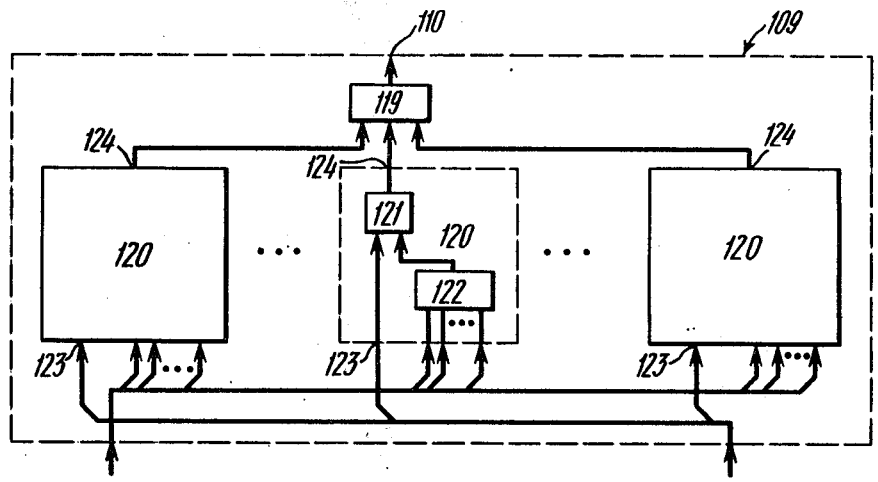
FIG. 22 is a block diagram of a test unit, according to the present invention.

FIG. 22 is a block diagram of the test unit 109 of the Fibonacci p-code adder 104 (FIG. 19), which comprises an OR gate 119 (FIG. 22) and n test stages 120 each incorporating an AND gate 121 and an OR gate 122. An input of the AND gate 121 is coupled to the output of the OR gate 122, whereas the other input of the AND gate 121 serves as an input 123 of an ith test stage 120. Inputs 123i (i=1, 2 ... n) constitute the carry input of the test unit 109, coupled to the carry output of the n-digit half-adder 107 (FIG. 19) to constitute the intermediate carry output of the Fibonacci p-number multiplier unit 72. The input 123 (FIG. 22) is coupled to a carry output $114_i$ (FIG. 19) of the carry output of the n-digit half-adder 107. 2p inputs of the OR gate 122 (FIG. 22) form the sum input of the test unit 109, coupled to the sum output of the n-digit half-adder 107 (FIG. 19), which is the intermediate sum output of the Fibonacci p-number multiplier unit 72. Inputs 1 through p of the multidigit input of the test unit 109 (FIG. 25) are coupled, respectively, to p outputs $113_i$ (FIG. 24) located to the right of the sum output of the n-digit half-adder 107, while the remaining inputs of the multidigit input of the test unit 109 (FIG. 22) are connected to p inputs $113_i$ (FIG. 21) located to the left of the sum output of the n-digit half-adder 107. The output of the AND gate 121, which is an output 124 of the ith test stage 120, is coupled to an ith input of the OR gate 119 whose output is the check output 110 of the test unit 109.

Figure 23:
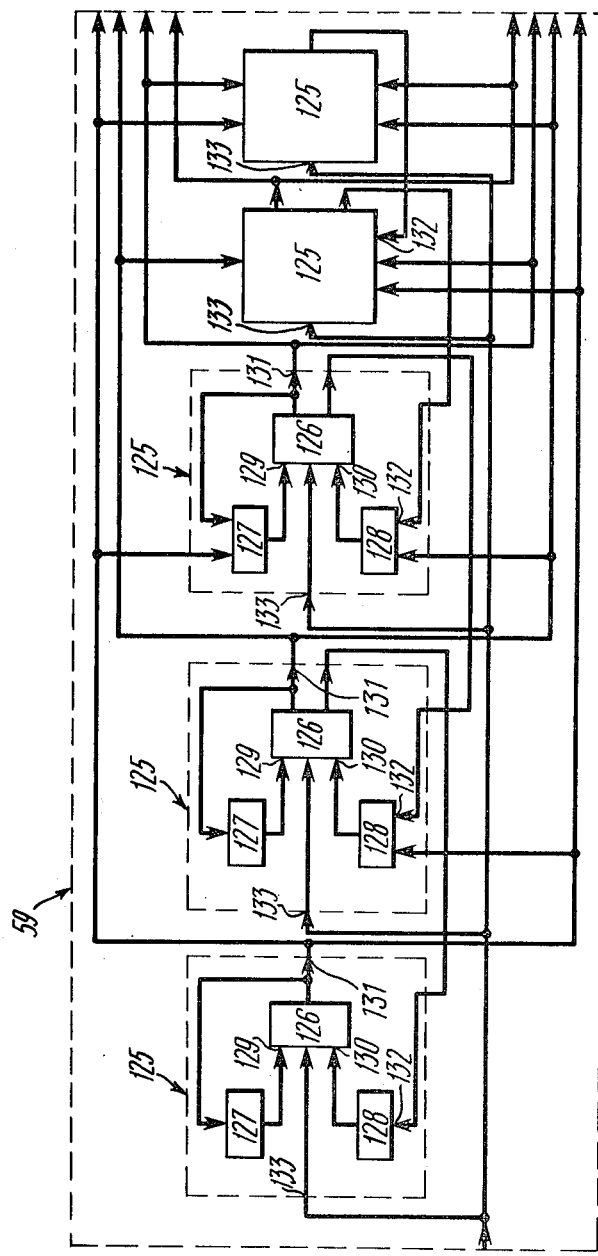
FIG. 23 is a Fibonacci p-code summary pulse counter, according to the present invention.

FIG. 23 is a block diagram of a Fibonacci p-code summary pulse counter 59 designed for parallel operation and used in a k-ary position code-to-Fibonacci p-code converter 61 of the input/output unit 40. The Fibonacci p-code summary pulse counter 59 comprises n counting stages 125, where n=5. The counting stage 125 incorporates a flip-flop 126, an AND gate 127 used to analyze the status of an [l−k (p+1)]th counting stage 125 (when p=1), and an AND gate 128 used to analyze the status of an (l−i(p+1)−1)th counting stage 125.

The "0" set input 129 and the "1" set input of the flip-flop 126 are coupled to respective outputs of the AND gate 127 and the AND gate 128. The "1" output of the flip-flop 126 is connected to an input of the AND gate 127 to constitute the "1" message output 131 of the counting stage 125, while the remaining inputs of the AND gate 127, whose number is equal to $$\frac{l-1}{p+1},$$

serve as "0" control inputs of the counting stage 125. An input 132 of the AND gate 128 is used as the message input of the counting stage 125, whereas the remaining $$\frac{l-2}{p+1} + 1$$

inputs of the AND gate 128 are control inputs of the counting stage 125, an ith control input of an lth counting stage 125 being coupled to the "1" message output 131 of the [l−i(p+1)−1]th counting stage 125. The "0" output of the flip-flop 126 is the "0" message output of the lth counting stage 125, coupled to the message input 123 of an (l−1)th counting stage 125. The count inputs of the flip-flops 126, which are clock inputs 133 of the counting stages 125, are connected to a common point that constitutes the count input of the Fibonacci p-code summary pulse counter 59; a kth "0" control input of the lth counting stage 125 is coupled to the "1" message output 131 of the l−k(p+1)th counting stage 125. The "1" message inputs of all counting stages 125 are used to form the multidigit message output of the Fibonacci p-code summary pulse counter 59 (FIG. 10).

Figure 24:
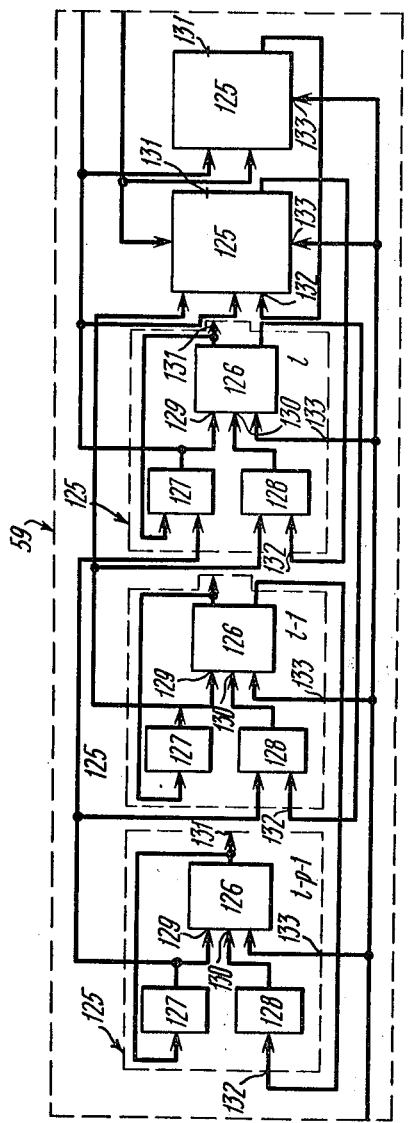
FIG. 24 is a block diagram of a Fibonacci p-code summary pulse counter designed for consecutive operation, according to the present invention.
Figure 26:
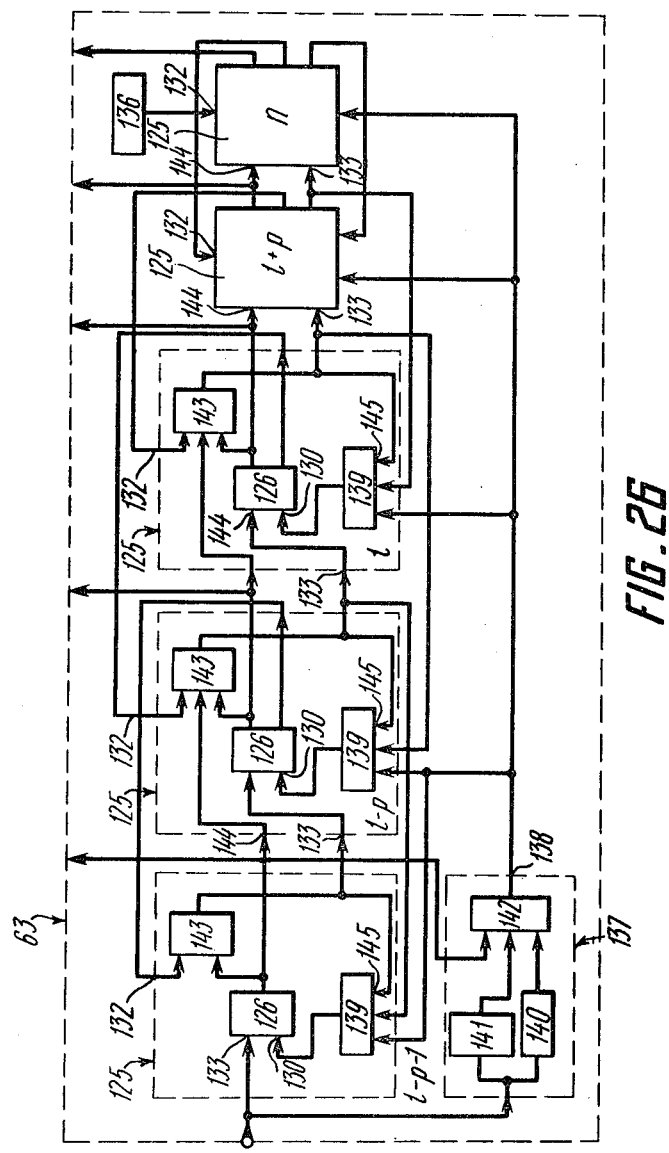
FIG. 26 is a block diagram of a Fibonacci p-code subtract pulse counter, according to the present invention.

FIG. 24 illustrates another embodiment of the Fibonacci p-code summary pulse counter 59 which comprises n counting stages 125 (n=5) each of which, just like the counting stage 125 of FIG. 26, comprises a flip-flop 126 having its "0" set input 129 and "1" set input 130 coupled to respective outputs of the AND gate 127 and the AND gate 128. The output of the AND gate 127 is the control output of the counting stage 125. The "1" output of the flip-flop 126 is coupled to an input of the AND gate 127 and used as the "1" message output 131 of the counting stage 125, while the other input of the AND gate 127 is used as a control input of the lth counting stage 125, coupled to the control output of an (l−p−1)th counting stage 125, which is the output of the AND gate 127 of the (l−p−1)th counting stage 125. The AND gate 127 and the AND gate 128 are used to analyze the status of the flip-flops 126 of respective counting stages 125 and to form respective logic 0 and logic 1 signals. An input of the AND gate 128 serves as the other control input of the lth counting stage 125, coupled to the control output of the (l−1)th counting stage 125. The other input of the AND gate 128 is the message input 132 of the lth counting stage 125, coupled to the "0" output of the flip-flop 126 of an (l+p)th counting stage 125. The count inputs of the flip-flops 126 of all counting stages 125 serve as the clock inputs 133 of the counting stages 125 and are connected to the count input of the Fibonacci p-code summary pulse counter 59. The "1" message outputs 131 of all counting stages 125 form the multidigit message output of the Fibonacci p-code summary pulse counter 59.

Figure 25:
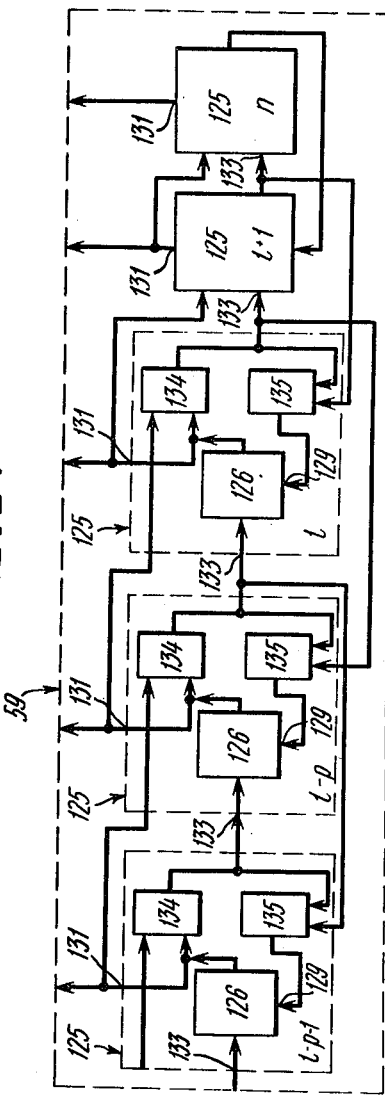
FIG. 25 is a block diagram of another embodiment of a Fibonaccy p-code summary pulse counter, according to present the invention.

FIG. 25 represents a block diagram of still another embodiment of the Fibonacci p-code summary pulse counter 59 which comprises a flip-flop 126 whose "1" output is coupled to one input of a logic unit 134 and serves as the "1" message output 131 of the counting stage 125. The other input of the logic unit 134, which is the message input of the lth counting stage 125, is coupled to the "1" message output 131 of an (l−p)th counting stage 125. The output of the logic unit 134 is coupled to the input of an OR gate 135 and serves as the control output of the lth counting stage 125, said output being coupled to the control input of the (l−p)th counting stage 125 (with p=1) and to the clock input 133 of an (l+1)th counting stage 125. The output of the OR gate 135 is coupled to the "0" set input 129 of the flip-flop 126 whose "1" set input 130 is the clock input 133 of the counting stage 125. The clock input 133 of a first counting stage 125 is the clock input of the Fibonacci p-code summary pulse counter 59, while the "1" message outputs 131 of all counting stages 125 form the multidigit message output of the Fibonacci p-code summary pulse counter 59.

FIG. 26 is a block diagram of the Fibonacci p-code subtract pulse counter 63 of the Fibonacci p-code-to-k-ary position code converter 62 of the input/output unit 40, said counter being provided with n counting stages 125, with a logic 0 generator 136 which produces logic 0's applied to the message input 132 of the nth counting stage 125, and with a logic unit 137 which produces reset pulses for the flip-flops 126 of all counting stages 125. An input of the logic unit 137 is coupled to the clock input 133 of the first counting stage 125, thereby forming the count input of the Fibonacci p-code subtract pulse counter 63. An output 138 of the logic unit 137 is coupled, via an OR gate 139 of each counting stage 125, to the "1" set input 129 of the flip-flop 126 of each counting stage 125.

The other input of the logic unit 137, which is coupled to the clock input 133 of the first counting stage 125, is connected to the inputs of a delay line 140 and an inverter 141 whose outputs are coupled to two inputs of an AND gate 142 whose output is the output 138 of the logic unit 137. The message input 132 of each counting stage 125 is an input of an AND gate 143. Another input of the latter is the other message input 144 of the counting stage 125, while the remaining input of the AND gate 143 is coupled to the "0" output of the flip-flop 126, which serves as the "0" message output of the lth counting stage 125 coupled to the message input 144 of the (l+p)th counting stage 125. The "0" message output of the first counting stage 125 is coupled to the remaining input of the AND gate 142 of the logic unit 137. The message input 132 of the lth counting stage 125 is coupled to the "1" message output 131 of the (l+1)th counting stage 125, which serves as the "1" output of the flip-flop 126, with l≠n. The output of the AND gate 143 is coupled to the input of the OR gate 139 and serves as the control output of the lth counting stage 125, coupled to the clock input 133 of the (l+1)th counting stage 125 and to the control input of the (l−p)th counting stage 125, said input being the remaining input of the OR gate 139 of the (l−p)th counting stage 125.

Figure 27:
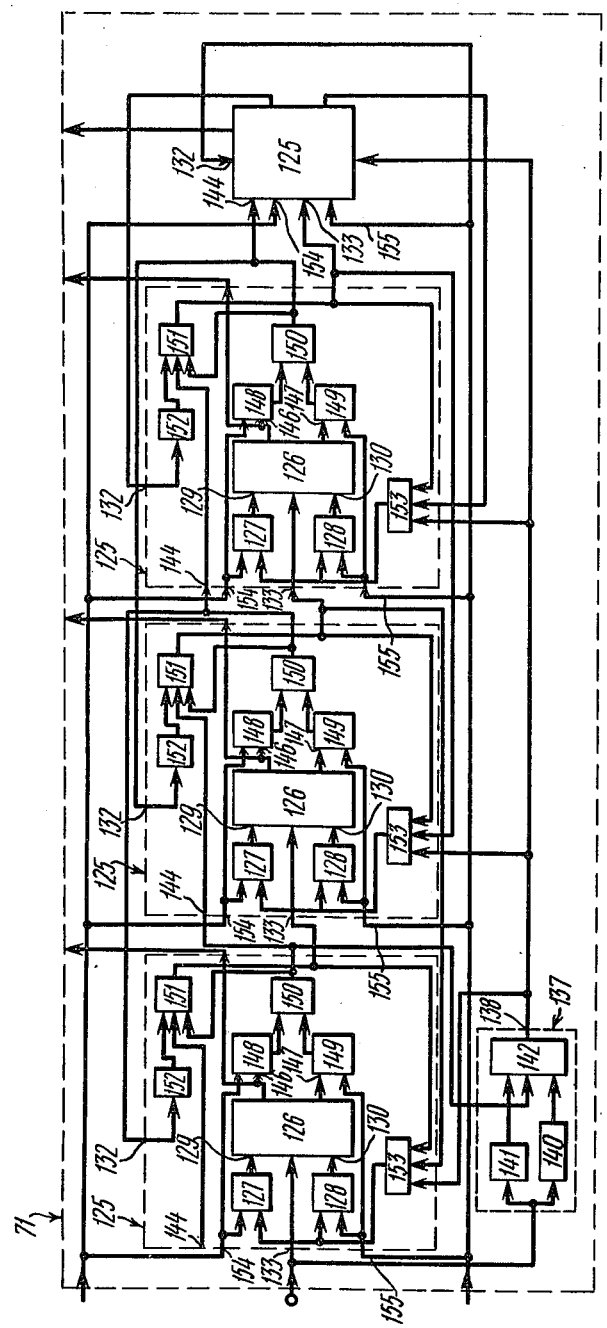
FIG. 27 is a Fibonacci p-code bidirectional pulse counter, according to the present invention.

FIG. 27 is a block diagram of the Fibonacci n-code bidirectional pulse counter 71 used in the input/output unit 40 for converting a k-ary position code to a Fibonacci p-code and vice versa. Said counter comprises n counting stages 125 (n=4) and a logic unit 137 similar to that of FIG. 26. Each counting stage 125 incorporates a flip-flop 126 having its "0" set input 129 and "1" set input 130 coupled to respective outputs of the AND gates 127, 128, whereas the "1" and "0" outputs of the flip-flop 126 are connected to inputs 146, 147 of AND gates 148, 149, respectively, whose outputs are coupled to inputs of an OR gate 150. The output of the OR gate 150 is the message output of the lth counting stage 125, coupled to the message input 132 of the (l−1)th counting stage 125. The output of the OR gate 150 is coupled to an input of an AND gate 151 whose other input serves as the other message input of the lth counting stage 125, coupled to the first message input 132 of the (l−p−1)th counting stage 125. The remaining input of the AND gate 151 is coupled, via an inverter 152, to the first message input 132 of the (l−p−1)th counting stage 125, while the output of the AND gate 151 is coupled to the input of an OR gate 153 and serves as the control output of the lth counting stage 125, coupled to the clock input 133 of the (l+1)th counting stage 125 and to the control input of the (l−p)th counting stage 125. Another input of the OR gate 153 serves as the control input of the lth counting stage 125, while the remaining input of the gate 153 of each counting stage 125 is coupled to the output 138 of the logic unit 137. The output of the OR gate 153 is coupled to some inputs of the AND gates 127, 128 having their other inputs connected to the remaining inputs of the AND gates 148, 149, respectively, and used as an add control input 154 and a subtract control input 155, respectively, of the counting stage 125; the add control stage 154 of each counting stage 125 is coupled to the add input of the Fibonacci p-code bidirectional pulse counter 71, whereas the subtract control input 155 of each counting stage 125 is coupled to the subtract input of the Fibonacci p-code bidirectional counter 71. The clock input 133 of each counting stage 125 is the count input of the flip-flop 126.

The Fibonacci p-code reduction device 1 operates as follows. Assume that the number 5 is represented in the Fibonacci 1-code differing from the Fibonacci minimal p-code as

| digit weight | 5 | 3 | 2 | 1 | 1 |
|---|---|---|---|---|---|
| Fibonacci 1-code | 0 | 1 | 0 | 1 | 1 | and is processed by the Fibonacci p-code reduction device 1 of FIG. 1 and by the functional stage 2 of FIG. 2, with p=1 and n=5, where n is the Fibonacci 1-code length. Binary data arrives at the message inputs 8 of the functional stages 2 and is set, via the OR gate 14 (FIG. 2), in the flip-flops 9 which assume their 0 states prior to enabling the message inputs 8. When the convolution control signal (a logic 1) is applied to the convolution control input of the Fibonacci p-code reduction device 1, (FIG. 1) connected to the convolution control input 7 of each functional stage 2, that signal appears at one of the inputs of the convolution unit 11. Since the convolution unit 11 is coupled to the flip-flops 9 of the functional stages 2 1, (l−1) and (l−2), it operates to test the contents of these flip-flops so as to determine whether the convolution is possible. In the case under consideration, the convolution condition is satisfied for the third position, i.e., when l=3. Thus, a logic 1 appears at the output of the convolution unit 11 of the third functional stage 2, that signal being passed via the OR gate 14 to set a 1 in the flip-flop 9 of the third functional stage 2. The same logic 1 from the convolution output of the third functional stage 2 (FIG. 1) comes to the convolution set inputs 5, 6 of the second and first functional stage 2, respectively, then passes through the OR gates 13 (FIG. 2) of the second and the third functional stage 2 (FIG. 1) to set 0's in the flip-flops 9 of these functional stages. Now, the first convolution step is complete and the number 01011 is represented as 01100, which allows the convolution to be carried out for the fifth functional stage 2 in accordance with the procedure described above. As a result, the original codeword finally becomes 10000 which is the minimal form of representation of the number 5 using the Fibonacci 1-code. The length of the convolution control signal available to the convolution control input must exceed the time taken by all possible convolutions. After the convolution control signal discontinues, data is read from the message outputs of all functional stages 2 in parallel.

When p=2, the convolution of bits of numbers represented in Fibonacci p-codes can be performed same as above using the devices 1 shown in FIGS. 3 and 4. FIG. 3 illustrates a Fibonacci p-code reduction device 1 which can perform devolution, too. When the minimal form of representation of a number in a Fibonacci p-code cannot be attained using all possible convolutions, then the functional stage 2 shown in FIG. 4 operates to carry out convolutions and devolutions in succession.

Given below is an example in which the number 8 represented by a Fibonacci p-code (p=2) as

| digit weight | 6 | 4 | 3 | 2 | 1 | 1 | 1 |
|---|---|---|---|---|---|---|---|
| Fibonacci p-code | 0 | 1 | 0 | 1 | 1 | 1 | 0 | is reduced to a Fibonacci minimal p-code. When the convolution control signal is applied to the convolution control input of the Fibonacci p-code reduction device 1, the latter operates to carry out the convolution. In the case under consideration, two convolutions can be performed as follows:

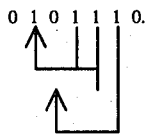

Therefore, the convolution signal (a logic 1) appears at the outputs of the convolution units 11 of the seventh and fifth functional stages 2. After passing through the inverters 25 of the seventh and fifth functional stages 2, that signal appears at the convolution inhibit outputs of the seventh and fifth functional stages 2 as the convolution ihibit signal which is an inverse convolution signal. The convolution inhibit signal comes from the seventh functional stage 2 to the convolution inhibit input 19 of the (l−2)th functional stage 2 which is the fifth functional stage 2 in this case. The convolution inhibit input 19 is one of the inputs of the AND gate 24 (FIG. 4); therefore, the convolution inhibit signal (a logic 0) disables the AND gate 24 of the fifth functional stage 2 and no convolution is carried out for the fifth position. Since a codeword

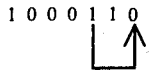

thus obtained is not the minimal form of representation of the number 8 in the Fibonacci p-code, the devolution of the lth position and positions (l−p) through (l−2p), inclusive, of the codeword must be performed. In the example we have l=3, and the devolution thus involves only the (l−2)th position, namely, the first position.

After the convolution control signal discontinues, the devolution control input 21 (FIG. 3) accepts the devolution control signal whose length exceeds appreciably the time taken by all possible devolutions.

The devolution that involves the third and first position is possible when logic 1's are present at the devolution message inputs 21 and at the devolution control input 20 of the third functional stage 2, all said inputs being used as the inputs of the devolution unit 23 built around an AND gate; this results in the appearance of the devolution signal at the output of the devolution unit 23, which comes, via the OR gate 13, to the "0" set input of the flip-flop 9 of the third functional stage 2, thereby placing the flip-flop 9 in a 0 state. At the same time, the devolution signal is accepted by the "1" set input 17 of the flip-flop 9 of the functional stage 2 with the result that said flip-flop is sent into a 1 state. On completion of this devolution step, the code reduces to

here, conditions are satisfied under which the devolution can involve the seventh fifth, fourth and third positions. As a result, codeword 0011111 is obtained which does not, however, feature the minimal form of representation of the number 8 by the Fibonacci p-code. This requires that the convolution control signal be applied to the convolution control input of the Fibonacci p-code reduction device 1 for a time interval equal to the length of that signal with the result that all possible convolutions are accomplished and the number 8 assumes its minimal Fibonacci p-code representation as follows: 1001000.

The Fibonacci p-code reduction device 1 of FIG. 5 operates in a manner similar to that described above, but each of its functional stages 2 is, in this case, provided with the additional devolution inhibit output coupled to the devolution inhibit outputs 27 of the functional stages 2 (l−2) through (l−p−1), inclusive. This rules out concurrent execution of two devolutions of a single position, which takes place, for instance, when the convolution of the bits of a codeword 101000000, which is the Fibonacci p-code representation of the number 11, is carried out (p=3). This codeword ensures conditions under which the devolution is valid for the ninth and seventh positions, i.e.:

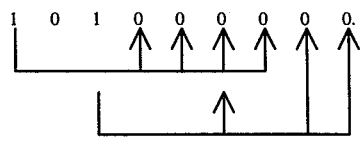

When the devolution signal is produced at the output of the AND gate 28 of the ninth functional stage 2, the devolution inhibit signal, which is an inverse devolution signal, appears at the devolution inhibit output of the devolution unit 23 of that functional stage 2, then arrives at the input of the AND gate 28 of the seventh functional stage 2 to inhibit the devolution of the seventh position.

FIG. 6 illustrates the minimality indicator 30. The AND gate 36 and the OR gate 38 of the lth stage 33 are used to test the contents of the lth functional stage 2 and those of the functional stages (l−1) through (l−p). If a logic 1 is present at the output of the lth functional stage 2 and at the output of at least one functional stage 2 among those numbered (l−1) through (l−p) a logic 1 is produced, then the output of the stage 33 generates a logic 1 which passes through the OR gate 31 to the output of the minimality indicator 30 to acknowledge that, at a given point of time, the code under analysis does not correspond to the minimal form of representation of a given number of the Fibonacci p-code. The convolution and devolution steps described above are carried out till the appearance on completion of the current convolution step, of a logic 0 at the output of the minimality indicator 30 to show that the code stored in the functional stages 2 features the minimal form of the Fibonacci p-code representation. The minimality indicator 30 makes it possible to determine the moment when the number represented by the Fibonacci p-code assumes its minimal form. This cuts down the time taken by the reduction process, thereby allowing for faster operation of the Fibonacci p-code reduction device 1.

As has been stated above, the Fibonacci p-code reduction device 1 of FIG. 4 can perform convolutions and devolutions. Due to the availability of the complement input, the code stored in the flip-flops 9 can be inverted. This is done when an appropriate signal is applied to the complement inputs 39 of all functional stages 2, thus placing the flip-flops 9 in their opposite states. As a result, a Fibonacci inverse p-code is obtained from a Fibonacci straight p-code.

Consider an example where Fibonacci straight p-code combination 0010000 is to be inverted (p=2). In this case, bits 1 through (n−p), where (n−p) gives bit 5, are reversed. This produces code 0001111 set in the flip-flops 9, which differs from the minimal form of representation of the number. Therefore, the convolution control input is enabled to carry out all possible convolutions and minimal form 0100100 is thus obtained. The latter is an inverse of the original combination 0010000, since their sum 1001000 is a Fibonacci maximal p-code which can be represented by the minimal form using the given code length of 7.

When one of the p high-order bits (with p=2) contains a 1, the complementing must be preceded by the devolution in order to remove a 1 from this bit.

If the number 6 represented by a Fibonacci p-code is stored in the flip-flops 9 as 1000000 (p=2), it takes the form 0011001 after all devolutions have been carried out. With the complement input of the Fibonacci p-code reduction device 1 enabled, the code 0011001 is inverted and code 0000110 is obtained, which is not the minimal form of representation of the number 6 in the Fibonacci p-code. According to the procedure described above, the convolution of the second, third and fourth bits is carried out by applying the convolution control signal to the convolution control input of the Fibonacci p-code reduction device 1, with the result that code 0001000 is produced, which is a Fibonacci inverse p-code of the number 6 represented in the Fibonacci straight p-code.

The digital data-processing device operates as follows. Original data in the form of electric signals corresponding to a k-ry position code is applied to the message input 41 of the input/output unit 40. The k-ary position code is set in the k-ary subtract pulse counter 58 of a conventional design. The count input of the k-ary subtract pulse counter 58 and the count input of the Fibonacci p-code summary pulse counter 59, both connected to the control input 49 of the input/output unit 40, accept, from the output of the control unit 47, control pulses whose repetition rate is chosen depending on the operating threshold of the flip-flop of the low-order position of the k-ary subtract pulse counter 58 and that of the flip-flop 126 of the first counting stage 125 of the Fibonacci p-code summary pulse counter 59. The control pulses are present at the count inputs of said counters till the moment when the k-ary subtract pulse counter assumes a 0 state. That moment is detected by the zero detector 60 which generates a naught signal applied to the input $48_1$ of the control unit 47 to discontinue the application of the control pulses to the control input 49. When the subtraction is carried out in the k-ary subtract pulse counter 58, the Fibonacci p-code summary pulse counter 59 operates to count the control pulses. At the moment when the application of the control pulses discontinues, the Fibonacci p-code summary counter 59 displays a Fibonacci p-code corresponding to the original k-ary position code.

If use is made of the embodiment of the Fibonacci p-code summary pulse counter 59 shown in FIG. 23, then the control pulses are counted as follows (with p=1):

| Counting stage (digit) No. | 1 | 2 | 3 | 4 | 5 |
|---|---|---|---|---|---|
| digit weight | 1 | 2 | 3 | 5 | 8 |

The flip-flops 126 of all counting stages 125 are held in their original 0 states, which corresponds to codeword 00000. The control pulses come to the clock inputs 133 of all counting stages 125, connected to the count input of the Fibonacci p-code summary pulse counter 59. From the "0" message output of the second counting stage 125, a logic 1 is delivered to a single input of the AND gate 128 of the first counting stage 125 and is then passed to the "1" set input of the flip-flop 126 of the first counting stage 125. The "0" and "1" set inputs of the flip-flops 126 of the remaining counting stages accept logic 0's, since a logic 0 is present at the "1" message output 131 of each counting stage 125. When the first control pulse arrives at the count input of the Fibonacci p-code summary pulse counter 59, the flip-flop 126 of the first counting stage 125 is sent into a 1 state, but all other flip-flops 126 do not change their states. Codeword 10000 is thus produced and a logic 1 from the "1" message output 131 of the first counting stage 125 comes to an input of the AND gate 128 of the second counting stage 125. The other input of the AND gate 128 accepts a logic 1 from the "0" message output of the third counting stage 125, which provides conditions under which the flip-flop 126 of the second counting stage 125 assumes its 1 state upon arrival of the next control pulse to the count input of the Fibonacci p-code summary pulse counter 59 of the second counting stage 125. In the first counting stage 125, the flip-flop 126 is placed in a 0 state, since a logic 1 from its "1" output is applied, via the AND gate 127, to the "0" set input 129 to make that flip-flop 126 ready for transfer to a 0 state, therefore, code 01000 is displayed by the Fibonacci p-code summary pulse counter 59 after the second control pulse discontinues. Then, 1's are counted in a manner similar to that described above.

In the embodiment of the Fibonacci p-code summary pulse counter 59 shown in FIG. 24, 1's are counted basically in the same manner as in the embodiment of FIG. 23. In the first counting stage 125, a logic 1 from the "0" message output of the second counting stage 125 passes via the AND gate 128 to prepare the flip-flop 126 of the first counting stage 125 for transfer to a 1 state; in other counting stages 125, a logic 0 from the control output of the preceding counting stage 125 comes to the other input of the AND gate 128; thus, upon arrival of the first control pulse at the clock inputs 133 of all counting stages 125, the Fibonacci p-code summary pulse counter 59 displays code 10000. The second 1 is written in a similar manner. Now, consider an example where code 01010 set in the Fibonacci p-code summary pulse counter 59 is supplemented by a 1. In the first counting stage 125, logic 0's are present at the "0" set input 129 and at the "1" set input 130 of the flip-flop 126 since the latter assumes a 0 state and a logic 0 comes from the "0" message output of the next counting stage 125. The "0" set input of the flip-flop 126 of the second counting stage 125 accepts a logic 1, since said flip-flop is in a 1 state. In the third counting stage 125, the "0" set input 129 and the "1" set input 130 of the flip-flop 126 accept logic 0's, since said flip-flop is in a 0 state, and a logic 0 is delivered from the "0" message output of the fourth counting stage 125. The "0" set input 129 of the flip-flop 126 of the fourth counting stage 125 accepts a logic 1 from the output of the AND gate 127 of said counting stage, since said flip-flop is in a 1 state; the other input of the AND gate 127 of the fourth counting stage 125 accepts a logic 1 from the control output of the second counting stage 125. A logic 1 from the output of the AND gate 127 of the fourth counting stage 125 comes through the AND gate 128 of the fifth counting stage 125 and makes the flip-flop 126 thereof ready for transfer to a 1 state. With the control pulse available, the Fibonacci p-code summary pulse counter 59 is forced to change from 01010 (described above) to 00001. An advantage of this embodiment over that of FIG. 23 resides in that any one of the AND gates 127, 128 requires only two inputs only, whereas each of the AND gates 127, 128 of the embodiment shown in FIG. 23 requires $$\frac{1-2}{p+1} + 2$$

inputs, where 1 is the number of the counting stage 125. Note, however, that the embodiment of FIG. 23 features faster operation in comparison with the embodiment of FIG. 24, since the former utilizes parallel operating mode.

The Fibonacci p-code summary pulse counter 59 according to FIG. 25 operates as follows. When a control pulse is applied to the clock input 133 of the first counting stage 125, the flip-flop 126 is sent into a 1 state. After the control pulse discontinues, a logic 1 from the "1" output of the flip-flop 126 comes through the logic unit 134 and through the OR gate 135 and causes the flip-flop 126 of the first counting stage 125 to take up a 0 state. At the same time, a logic 1 from the output of the logic unit 134 of the first counting stage 125 comes to the "1" set input of the flip-flop 126 of the second counting stage 125 to place said flip-flop in a 1 state. Upon arrival of the second control pulse, the flip-flop 126 of the first counting stage 125 is placed in a 1 state. After that control pulse discontinues, 1's in the first and the second counting stage 125 are changes by a 1 in the third counting stage 125 and the logic unit 134 thus produces a logic 1 applied, via the OR gate 135, to the "0" set inputs 129 of the flip-flops 126 of the first and second counting stages 125 and to the "1" set input 130 of the flip-flop 126 of the third counting stage 125. The Fibonacci p-code set in the Fibonacci p-code summary pulse counter 59, upon arrival of the control pulse, differs from its minimal form. The code assumes its minimal form asynchronously so that no control signals are present. Also, there is no necessity to use trigger flip-flops available in conventional counters.

From the output of the Fibonacci p-code summary pulse counter 59 (FIG. 8). Fibonacci p-code data arrives at the message input 43 of the arithmetic unit 44 and at the message inputs of the multiplicand register 66 and the factor register 67 and is set in said registers. The embodiment of the arithmetic unit 44 shown in FIG. 8 allows for multiplication of fractional numbers represented in Fibonacci p-codes, as follows. With the original Fibonaci p-code obtainable from the control unit 47 and applied to the message inputs of the multiplicand register 66 and the factor register 67, the control inputs of said registers, coupled to the control input $50_1$, accept a control signal which causes the original Fibonacci p-code to be set in either the multiplicand register 66 or the factor register 67 (of course, the multiplicand register 66 receives multiplicands and the factor register 67 receives factors). If multiplication begins with low-order positions, then the output of the extreme position of the factor register 67 is represented by the output of the low-order position. On the other hand, the output of the high-order position serves as the output of the extreme position of the factor register 67 when multiplication begins with high-order positions. In both cases, the multiplication procedure is identical, except that in the first case the multiplicand is shifted to the left and the factor is shifted to the right and in the second case the multiplicand is shifted to the right and the factor is shifted to the left.

The first method of multiplication basically consists in the following. The next control signal obtainable from the unit 47 is used to set the next codeword in the factor register 67. If a logic 1 is present at the output of the low-order position of the factor register 67 (i.e., a 1 is set in the low-order position, then that logic 1, when applied to the control unit 47, causes said unit to generate a control signal that appears at the control input $50_2$, hence, at the control input of the Fibonacci p-code adder 69. The code set in the Fibonacci p-code adder 69 is added to another code supplied to its addend input 68 from the multiplicand register 66. The addition in the Fibonacci p-code adder 69 consists in the production of codewords which represent an intermediate sum and an intermediate carry. These codewords are delivered to the minimization unit 51 where two Fibonacci p-code reduction devices 1 described with reference to FIGS. 1, 3, 5 operate to reduce the supplied Fibonacci p-codes to minimal form. This is done using the convolution and devolution control signals which come from the control unit 47 (FIG. 6) to the inputs of the control input group 54, serving as the cnvolution control inputs and the devolution control inputs of the Fibonacci p-code reduction devices 1.

In synchronous mode of operation provided by the Fibonacci p-code reduction devices 1 of FIGS. 1, 3, 5, the number of control signals must be maximum to ensure reduction of the Fibonacci p-code of a given length to minimal form. For asynchronous operation provided by the Fibonacci p-code reduction device 1 shown in FIG. 6, the signals acknowleding that the Fibonacci p-code has been reduced to minimal form are delivered from the minimality indicators 30 to the control unit 47 (FIG. 8), with the result that the latter stops generating the convolution and devolution control signals. The codewords reduced to minimal form come from the outputs of the minimization unit 51 to the additional message inputs $53_2$, $53_1$ and to the intermediate sum input and the intermediate carry input of the Fibonacci p-code adder 69. After the addition has been completed, the codewords set in the multiplicand register 66 and in the factor register 67 are shifted by one bit position in response to the signal supplied from the control unit 47. If the low-order position of the factor register 67 contains a 1, the above procedure is repeated. If the low-order position contains a 0, a logic 0 from the output of the low-order position of the factor register 47 comes to the control unit 47 which produces a shift-of-one-position signal delivered to the control inputs of the factor register 67 and the multiplicand register 66. The multiplication is continued until all bit positions of the factor, written in the register 67, are multiplied using the factor register 67; the Fibonacci p-code adder 69 registers the product of the multiplicand by the factor to be delivered from the message output of the Fibonacci p-code adder 69, which is the message output of the arithmetic unit 44, to the message input 45 of the input/output unit 40. Then, the codeword is set in the Fibonacci p-code subtract pulse counter 63. The control pulse from the control unit 47 comes to the input $49_2$ which serves as the count input of the Fibonacci p-code subtract pulse counter 63 and the count input of the k-ary summary pulse counter 65. The control pulses are delivered from the control unit 47 and Fibonacci p-codes are thus converted to k-ary position codes till the appearance of 0's in all counting stages 125 (FIG. 26) of the Fibonacci p-code subtract pulse counter 63, which causes the zero detector 64 to generate a naught signal applied to the input $48_2$ of the control unit 47, which stops generating the control pulses for the input $49_2$ of the input/output unit 40. The k-ary summary pulse counter 65 registers the result of the Fibonacci p-code-to-k-ary position code conversion, which is applied to the message output 42 of the input/output unit 40 in the form of a set of electric signals.

Pulses conveying Fibonacci p-codes are subtracted in the Fibonacci p-code subtract pulse counter 63 shown in FIG. 26. Originally, the flip-flops 126 of all counting stages 125 assume their 0 states. With the first control pulse present, the logic unit 137, with the help of the delay line 140, generates a logic 1 to follow the trailing edge of that control pulse, said logic 1 being used to send the flip-flops 126 of all counting stages 125 in their 1 states. When the count input of the Fibonacci p-code subtract pulse counter 63 accepts the second control pulse, the flip-flop 126 of the first counting stage 125 changes to a 0 state. After that control pulse discontinues, a logic 1 comes from the "0" output of the flip-flop 126 to one input of the AND gate 143 of the first counting stage 125, while a logic 1 from the "1" message output 131 of the second counting stage 125, coupled to the "1" output of the flip-flop 126 of the second counting stage 125, comes to the other input of the AND gate 143. The output of the AND gate 143 of the first counting stage 125 produces a logic 1 which is applied to the clock input 133 of the second counting stage 125 to place its flip-flop 126 in a 0 state amd is passed through the OR gate 139 of the first counting stage 125 to place the flip-flop 126 of the latter to a 1 state. The contents of all counting stages 125 of the Fibonacci p-code subtract pulse counter 63 correspond to codeword 10111. The next control pulse is used to send the flip-flop 126 of the first counting stage 125 into a 0 state, and the Fibonacci p-code subtract pulse counter 63 into an unstable state which corresponds to codeword 00111. After that control pulse discontinues, the Fibonacci p-code subtract pulse counter 63 automatically changes to a stable state (11011), since a logic 1 appears at the output of the AND gate 143 of the second counting stage 125 and logic 1's are present at the "0" output of the flip-flop 126 of the second counting stage 125, at the other message input 144 of the second counting stage 125, and at a message input 132 of said counting stage. The output of the AND gate 143 generates a logic 1 to place the flip-flop 126 of the third counting stage 125 to a 0 state and to place the flip-flops 126 of the first and second counting stages 125 to a 1 state.

In the digital data-processing device shown in FIG. 9, the message input 41, which is the message input of the k-ary bidirectional pulse counter 70, accepts data in the form of a k-ary position code. At the same time, the control input $49_1$ of the input/output unit 40, coupled to the subtract input of the k-ary bidirectional pulse counter 70 and to the add input of the Fibonacci p-code bidirectional pulse counter 71, accepts a control signal whose length provides for the k-ary position code-to-Fibonacci p-code conversion. The control input $49_3$ and the count inputs of the k-ary bidirectional pulse counter 70 and the Fibonacci p-code bidirectional pulse counter 71 accept control pulses until the k-ary bidirectional pulse counter assumes a 0 state. As a result, the zero detector 60 generates a naught signal to be delivered to the input $48_1$ of the control unit 47 so as to inhibit application of the control pulses to the input $49_3$. The Fibonacci p-code bidirectional pulse counter 71 registers the Fibonacci p-code corresponding to the original k-ary position code which is applied to the message input 43 of the arithmetic unit 44. According to the control pulses available at the input $50_2$ of the arithmetic unit 44, the Fibonacci p-code representing the multiplicand is set in the Fibonacci p-number multiplier unit 72, and the Fibonacci p-code representing the factor is set in the factor register 67. Then, the arithmetic unit 44 operates to multiply the multiplicand from the Fibonacci p-number multiplier unit 72 by the first Fibonacci p-number which is one. If the low-order position of the factor register 67 given the weight of 1 contains a 1, then its output produces a logic 1 applied to the control unit 47 which generates a respective add control signals accepted by the control input of the Fibonacci p-code adder 69. The latter operates to add the Fibonacci p-code taken by its addend input 68 from the Fibonacci p-number multiplier unit 72 with the contents of the Fibonacci p-code adder 69. The control signal accepted by the input $50_2$ of the arithmetic unit 44 causes the Fibonacci p-code representing the factor to be shifted one bit position to the right. At the same time, the Fibonacci p-number multiplier unit 72 operates to multiply the multiplicand by the next Fibonacci p-number. If the low-order position of the factor register 67 produces a logic 0, then the above operation comprising shift and multiplication steps is performed again. The multiplicands in the Fibonacci p-number multiplier unit 72 are multiplied by the Fibonacci p-numbers using sequential addition which gives intermediate sums and intermediate carries to be reduced to minimal form according to the method described above.

One number is multiplied by another until all bit positions of the factor contained in the factor register 67 are exhausted. The multiplication result is formed in the Fibonacci p-code adder 69 and is then passed to the message input 45 of the input/output unit 40 to be set in the Fibonacci p-code bidirectional pulse counter 71. The input $49_2$ of the input/output unit 40, coupled to the add input of the k-ary bidirectional pulse counter 70 and to the subtract input of the Fibonacci p-code bidirectional pulse counter 71, accepts the control signal from the control unit 47. With respective control pulses present at the count inputs of said counters, this causes the k-ary bidirectional pulse counter 70 to sum up the control pulses and the Fibonacci p-code bidirectional pulse counter 71 to subtract 1's from the Fibonacci p-code contained therein. These events take place until the Fibonacci p-code bidirectional pulse counter 71 takes up a 0 state and the zero detector 60, therefore, generates a naught signal to be applied to the input $48_2$ of the control unit 47 to inhibit application of control pulses thereto. The k-ary bidirectional pulse counter 70 displays a k-ary position code which represents the result of the Fibonacci p-code multiplication.

Due to the availability of the Fibonacci p-code bidirectional pulse counter 71 and the k-ary bidirectional pulse counter 70, hardware costs of the input/output unit 40 are reduced, and the present embodiment of the arithmetic unit 44 allows for the multiplication of integers.

The Fibonacci p-code bidirectional pulse counter 71 operates as follows, with reference to FIGS. 19, 25 which represent, respectively, block diagrams of the Fibonacci p-code subtract pulse counter 63 and the Fibonacci p-code summary pulse counter 59. During addition, the first control signal is applied to the add input of the Fibonacci p-code bidirectional pulse counter 71 (FIG. 27), coupled to the add control input 154 of each counting stage 125. Under these conditions, the output of the OR gate 153 is coupled, via the AND gate 127, to the "0" set input of the flip-flop 126 of each counting stage 125, while the "1" output of each flip-flop 126 is coupled to an input of the AND gate 151 via the AND gate 140 and via the OR gate 150. In the case of addition, pulses are counted in the same manner as in the Fibonacci p-code summary pulse counter 59 of FIG. 25. In the case of countdown of the Fibonacci p-code pulses, the control signal comes to the subtract input of the Fibonacci p-code bidirectional pulse counter 71, coupled to the subtract control inputs 155 of all counting stages 125. Here, the output of the OR gate 153 which performs the function of the OR gate 139 is coupled to the "1" set input of the flip-flops 126 of all counting stages 125 via the AND gate 128, whereas the "0" output of each flip-flop 126 is coupled, via the AND gate 149 and the OR gate 150, to an input of the AND gate 151 which performs the function of the AND gate 143. In this case, the Fibonacci p-code bidirectional pulse counter 71 operates similarly to the Fibonacci p-code subtract pulse counter 63 of FIG. 19.

FIG. 7 is a block diagram of another embodiment of the digital data-processing device where, along with the conversion of k-ary position codes to Fibonacci p-codes performed in the k-ary position code-to-Fibonacci p-code converter 61, there results the formation of intermediate sums and intermediate carries in the Fibonacci p-code adder 77. These are to be reduced to minimal form using additional Fibonacci p-code reduction devices 1; also, connections are introduced to couple the input/output unit 40 to the Fibonacci p-code minimization unit 51. Data in the form of a k-ary position code accepted by the message input 41 of the input/output unit 40 is set in the register 73. Each bit position of the register 73 is interrogated by signals delivered in succession from the control unit 47 to the inputs $49_2$ through $49_{m+1}$ of the input/output unit 40, which serve as the inputs of the AND gates $74_1$ through $74_m$ of the AND gate unit 74. If a logic 1 is present at either input of each AND gate among the AND gates $74_1$ through $74_m$ of the AND gate unit 74, the output of said AND gate produces a logic 1 that comes to the input of a respective OR gate of the OR gate unit 75. As a result, the output 76 of the OR gate 75 produces a Fibonacci p-code corresponding to the weight of that bit position of the register 73, which is being interrogated at a given point of time.

Let the number 7 represented by the binary code as

| digit weight | 4 | 2 | 1 |
|---|---|---|---|
| Binary code | 1 | 1 | 1 | be converted to a Fibonacci p-code, with p=1. With a control signal at the input $49_2$, the output of the AND gate $74_1$ produces a logic 1. The output 76 generates a Fibonacci p-code in the following form:

| digit weight | 5 | 3 | 2 | 1 |
|---|---|---|---|---|
| Fibonacci p-code | 0 | 0 | 0 | 1 |

The signal taken by the input $49_1$, which is the control input of the Fibonacci p-code adder 77, from the control unit 47 causes the first codeword to be added to codeword 0000 set in the Fibonacci p-code adder 77, which gives the first codeword 0001 contained in the Fibonacci p-code adder 77. The interrogation of the second bit position of the register 73 results in the appearance at the output 76 of the following Fibonacci p-code:

| digit weight | 5 | 3 | 2 | 1 |
|---|---|---|---|---|
| Fibonacci p-code | 0 | 0 | 1 | 0 |

Now, using the control signal from the control unit 47, the first codeword 0001 in the Fibonacci p-code adder 77 is added to the second codeword 0010 with the result that intermediate sum 0011 is obtained which is reduced to its minimal form 0100 in the Fibonacci p-code minimization unit 51. After the third bit position of the register 73, given the weight of 4, has been interrogated, the following Fibonacci p-code appears at the output 76 of the OR gate unit 75:

| digit weight   | 5 | 3 | 2 | 1 |
|---|---|---|---|---|
| Fibonacci p-code | 0 | 1 | 0 | 1 |

The addition of the third codeword to the previous addition result stored in the Fibonacci p-code adder 77 gives 1010 which is the minimal form of representation of the number 7 by the Fibonacci p-code.

This embodiment of the k-ary position code-to-Fibonacci p-code converter 61 offers faster operation, in comparison to the previously described embodiments, since, in this case, the original k-ary position code is converted in a bit-by-bit fashion.

FIG. 11 is a block diagram of the arithmetic unit 44 which operates basically in the same fashion as in the embodiments described above. Here, however, with a 1 present at the output of the low-order position of the factor register 67, a required code can be shifted by (p+1) positions, a feature provided by the minimal form of representation of a number in terms of Fibonacci p-codes, which form is characterized in that each 1 thereof is followed by at least p 0's. The codes in the multiplicand register 67 and in the factor register 67 are shifted by (p+1) positions with the help of a control signal which comes to the input $50_3$ of the arithmetic unit from the control unit 47. Such a shift permits cutting down the time taken by the Fibonacci p-code multiplication.

FIG. 12 represents a block diagram of still another embodiment of the arithmetic unit 44 which enables control of conditions under which codes are stored and shifted in the multiplicand register 66 and in the factor register 67. This is done by producing, in the minimality indicators 30, signals indicating that the Fibonacci p-code minimal form is disturbed in case some circuitry element fails. These signals come from the outputs 82, 83 of the minimality indicators 30 to the inputs of the input group 46 of the control unit 47, and the arithmetic unit 44 is thus made inoperative. In addition, this embodiment of the arithmetic unit 44 provides for control of the Fibonacci p-code adder 69, which is effected by means of the test unit 109 connected to the control unit 47.

The arithmetic unit 44 shown in FIG. 13 basically resembles that of FIG. 8. In this embodiment data in terms of Fibonacci p-codes comes from the output of the multiplicand register 66 not directly to the input 68 of the Fibonacci p-code adder 69, but via one of the AND gate units $84_1$ through $84_{p+1}$ and via the OR gate unit 85. The AND gate unit $84_1$ operates to multiply the multiplicand set in the multiplicand register 66 by a given bit of the factor set in the factor register 67. If, for example, the first bits of the multiplicand and the factor are 1's, then the multiplicand code available from the output of the AND gate unit $84_1$ is directed to the addend input 68 of the Fibonacci p-code adder 69 via the OR gate unit 85. If the value of the ith position of the multiplicand or the factor, or both of them, is a 0, then a zero code is obtainable from the output of the AND gate unit $84_i$. It follows from the definition of the minimal form of representation of a number in a Fibonacci p-code that the Fibonacci p-code of the multiplicand can be present at the output of a single one of the AND gate units 84 whose total number is equal to (p+1). This allows the codes in the multiplicand register 66 and in the factor register 67 to be shifted by (p+1) positions, thereby providing for faster operation of the arithmetic unit 44.

Since the above Fibonacci p-code can be present at the output of one AND gate unit 84 only, the multiplication is controlled using the test unit 87 of a conventional design. If a Fibonacci p-code appears at the outputs of more than one AND gate unit 84, then the test unit 87 generates an error signal accepted by the control unit 47 which thus disables the arithmetic unit 44. Here, the conditions under which codes are stored and shifted in the factor register 67 and in the multiplicand register 66 are controlled and the Fibonacci p-code adder 69 is checked for proper operation in accordance with the description of the preceding embodiment of the arithmetic unit 44.

The multiplication of integers is controlled using the test unit 109 incorporated in the Fibonacci p-code adder 69, as well as test units designed as the minimality indicators 30 and incorporated in the Fibonacci p-number multiplier unit 72.

The arithmetic unit 44 using the above-described test units is shown in FIG. 14. It is provided with the minimality indicator 30 to control the storing and shifting of codes in the factor register 67. If some circuitry element fails, error signals are passed from the check output 81 of the Fibonacci p-code adder 69, from the check output 89 of the Fibonacci p-number multiplier unit 72, and from the output 83 of the minimality indicator 30 to the control unit 47 which thus disables the arithmetic unit 44.

FIG. 15 is a block diagram of the arithmetic unit 44 which operates to divide numbers in terms of Fibonacci p-codes as follows. Codewords representing the dividend and the divisor are delivered in succession to the message input 43 of the arithmetic unit 44 and, therefore, to respective inputs of the dividend register 91 and the divisor register 90, and are set in said registers. A control signal applied to the input $50_1$ from the control unit 47 causes the divisor codeword to be placed from the output of the divisor register 90 in the Fibonacci p-number multiplier unit 72 where Fibonacci p-number multiplication is carried out to produce intermediate sums and intermediate carries whose codewords are minimized in the Fibonacci p-code reduction devices $1_1$, $1_2$. Each product of the divisor by a given Fibonacci p-number reduced to minimal form is passed from the message output of the Fibonacci p-number multiplier unit 72 to the input of the Fibonacci p-code reduction device $1_3$. The latter uses signals delivered to the inputs $54_1$ through $54_3$ from the control unit 47 to convert the product of the divisor by the given Fibonacci p-number, represented by a Fibonacci straight p-code, to a Fibonacci inverse p-code according to the method set forth above. The Fibonacci inverse p-code produced by the output of the Fibonacci p-code reduction device $1_3$ is applied to the input $53_1$ which is the first addend input of the Fibonacci p-code adder 69. The latter operates to add the Fibonacci inverse p-code to the Fibonacci p-code available to the second addend input 68 of the Fibonacci p-code adder 69 from the dividend register 91 in accordance with the previously described method. The addition of the Fibonacci straight and inverse p-codes replaces the subtraction necessary for the comparison of the dividend codeword with the product of the divisor and the Fibonacci p-number set in the Fibonacci p-number multiplier unit 72. The codeword generated by the Fibonacci p-code adder 69 is set in the additional register 93 according to the signal that comes from the control unit 47 to the input $50_1$ of the arithmetic unit 44. If the value of the high-order bit of that codeword is a 1, which acknowledges that the dividend exceeds the product of the divisor and the Fibonacci p-number, then a 0 is placed in the quotient register 94. With the next control signal at the input $50_1$ and with a train of control pulses at the input $50_2$, the next step is executed in which the divisor is multiplied by the next Fibonacci p-number and the dividend is compared with the newly obtained product. These multiply/compare steps run until the product of the divisor and the given Fibonacci p-number exceeds the dividend, in which case a 0 is placed in the high-order position of the Fibonacci p-code adder 69 and a 1 is set in that position of the quotient register 94, which was handled during the preceding multiply/compare step. At the same time, the codeword representing the difference between the dividend and the product of the divisor and the given Fibonacci p-number, obtained in the preceding multiply/compare step and stored in the additional register 93, is placed in the dividend register 91 according to the signal passed from the control unit 47 to the input $50_1$ of the arithmetic unit 44. That codeword is the remainder resulting from the division. Then, use is made of the signals from the control unit 47 which are applied to the inputs $50_3$, $50_2$ to allow the divisor codeword from the divisor register 90 to be set in the Fibonacci p-number multiplier unit 72 and multiplying this codeword by Fibonacci p-numbers. The multiply/compare steps are executed again, but now the product is compared to the division remainder stored in the dividend register 91. The remainders set in the dividend register 91 and the quotients placed in the quotient register 94 are produced until all values of n bits of the quotient are obtained, n being selected to provide for a required accuracy of calculation. The quotient codeword produced by the output of the quotient register 94 is applied to the message input 45 of the input/output unit 40.

The arithmetic unit 44 of FIG. 16 operates basically in the same manner as that described above, except that in this embodiment the dividend codeword is applied to the input 68 of the Fibonacci p-coder 69, while the dividend, as well as subsequent remainders resulting from the division of the dividend by the divisor set in the divisor register 90, are compared by means of the code comparison unit 95 of a conventional design. Like the embodiment described above, this circuitry uses the Fibonacci p-code adder 69 to generate the next remainder when the product of the divisor by a given Fibonacci p-number exceeds the dividend or the existing remainder. A 1 is set in that bit position of quotient register 94, which was handled in the preceding multiply/compare step.

The next remainder is formed by adding the dividend or the existing remainder to the Fibonacci inverse p-code of the product of the divisor by a given Fibonacci p-number, obtained in the preceding multiply/compare step. This product is delivered from the additional message output of the Fibonacci p-number multiplier unit 72 to the Fibonacci p-code minimization unit 51 to be converted therein to the Fibonacci inverse p-code. Lower hardware costs are involved in this embodiment.

The validity of data processing may be increased in the embodiment of the arithmetic unit 44 (FIG. 1) comprising minimality indicators 30 which generate error signals to show that the Fibonacci p-code minimal form is disturbed due to failed elements in the divisor register 90 or in the quotient register 94. In addition, test units 109 (FIG. 22) are incorporated in the Fibonacci p-number multiplier unit 72 and in the Fibonacci p-code adder 69 to generate error signals in case said apparatus fail. When generated at the check output 89 (FIG. 17) of the Fibonacci p-number multiplier unit 72, at the check output 81 of the Fibonacci p-code adder 69, and at the outputs 97, 98 of the minimality indicators 30, these error signals are applied to the control unit 47 which disables the arithmetic unit 44.

The Fibonacci p-number multiplier unit 72 (FIG. 18) operates as follows. A codeword is to be multiplied by a Fibonacci p-number multiplier unit 72, which serves as one of the message inputs 100 of registers $99_1$ through $99_{p+1}$. The control signal applied to control inputs 101 of all registers $99_1$ through $99_{p+1}$ causes the original codeword in the divisor register 90 to be set in the registers $99_1$ through $99_p$ and the zero codeword to be set in the register $99_{p+1}$. With control signals present at the control inputs of the registers 103, 106, the zero codeword is placed in the register 106, the original codeword is placed in the register 103, and these codewords are summed up in the n-digit half-adder 107. As a result, codewords representing intermediate sums and intermediate carries are obtained to pass from respective outputs of the Fibonacci p-number multiplier unit 72 to the Fibonacci p-code minimization unit 51. These codewords, after minimization, are applied again to the message inputs of the registers 103, 106 of the Fibonacci p-code adder 104 and are set in said registers according to a respective control signal from the control unit 47. The number of recurrent steps that deal with the reduction to minimal form and addition of Fibonacci p-codes must be as great as possible and equal to $n/(p+1)$, where n is the Fibonacci p-code.

The average number of recurrent steps may be reduced by using the zero detector 111 which generates an add complete signal when the intermediate carry codeword in the register 106 becomes equal to zero. The final result of addition appears at the output of the register 103 and is set in the register $99_1$. At the same time, data is transferred from each preceding register $99_i$ to each succeeding register $99_{i+1}$ using a control signal passed from the control unit 47 to the control inputs 101.

The results of multiplication of the number 4 by Fibonacci p-numbers (with p=3) are tabulated below by way of illustration.

| Fibonacci p-number | Contents of registers | | | | Multiplication result |
|---|---|---|---|---|---|
| | $99_1$ | $99_2$ | $99_3$ | $99_4$ | |
| | 4 | 4 | 4 | 4 | |
| 1 | 4 | 4 | 4 | 4 | 4 |
| 2 | 8 | 4 | 4 | 4 | 8 |
| 3 | 12 | 8 | 4 | 4 | 12 |
| 4 | 16 | 12 | 8 | 4 | 16 |
| 5 | 20 | 16 | 12 | 8 | 20 |
| 7 | 28 | 20 | 16 | 12 | 28 |
| 10 | 40 | 28 | 20 | 16 | 40 |
| 14 | 56 | 40 | 28 | 20 | 56 |

During multiplication performed in the Fibonacci p-number multiplier unit 72, codes in the registers 99 are tested for proper writing and storing with the aid of the minimality indicators 30 which generate error signals in the case of the Fibonacci p-code minimal form being disturbed, said error signals being applied to the check output 89 via the OR gate 108. In addition, the forming of intermediate sums and intermediate carries in the Fibonacci p-code adder 104 is tested using the test unit 109 whose output generates error signals delivered to the input of the OR gate 108. It follows from the definition of the Fibonacci p-code minimal form that a 1 carry present at the carry output 114 of the ith stage 112 of the n-digit half adder 107 in the case of addition always causes the appearance of logic 0's at the sum outputs 113 of p stages 112 located both to the right and to the left of the ith stage 112. Otherwise, the n-digit half-adder 107 is considered to be at fault. To detect the error, the test unit 109 operates as follows. A 1 carry from the output 114$_i$ comes to the input 123 of the test stage 120. If the input 123 accepts, concurrently, at least one logic 1 from one of the outputs 113 of said stages 112 of the n-digit half-adder 107, then it is passed via the OR gate 122 and via the AND gate 121 to the output 124 of the test stage 120, and via the OR gate 119 to the output 108 of the test unit 109.

What is claimed is:

1. A method of reduction of Fibonacci p-codes to minimal form, comprising the steps of performing all convolutions of bits of an original Fibonacci p-code of a number whereto an original combination of binary signals corresponds, processing said original combination of binary signals by replacing a binary signal corresponding to a 0 value of the lth digit of the original Fibonacci p-code of the number by its inverse signal, and replacing binary signals corresponding to 1 values of the $(l-1)$th and the $(l-p-1)$th digit of the original Fibonacci p-code of the number by its inverse signal.

2. A method as claimed in claim 1, comprising further performing all devolutions of bits of the original Fibonacci p-code of a number whereto the original combination of binary signals corresponds, processing said original combination of binary signals by replacing a binary signal corresponding to a 1 value of the lth digit of the original Fibonacci p-code of the number by its inverse signal, and replacing binary signals corresponding to 0 values of the digits $(l-p)$ through $(l-2p)$, inclusive, by its inverse signal, said processing step being of the original Fibonacci p-code of the number.

3. A device for reduction of Fibonacci p-codes to minimal form, comprising:
n functional stages, involving those labeled l, $(l-1)$, and $(l-p-1)$, each being provided with at least two convolution set inputs comprising a first and second convolution set inputs, a convolution control input, a message input, a message output, and a convolution output;
said convolution output of said lth functional stage being coupled to one of said convolution set inputs of said $(l-1)$th functional stage and to one of said convolution set inputs of said $(l-p-1)$th functional stage;
convolution message inputs of said lth functional stage being coupled, respectively, to said message outputs of said $(l-1)$th and $(l-p-1)$th functional stages;
said message inputs of all said functional stages forming a multidigit message input of said device for reduction of Fibonacci p-codes to minimal form;
said message outputs of said functional stages forming a multidigit message output of said device for reduction of Fibonacci p-codes to minimal form;
said convolution control inputs of all said functional stages being connected to a common point which is a convolution control input of said device for reduction of Fibonacci p-codes to minimal form, where $p=1, 2, 3 \ldots$; $l=3,4, \ldots n$; and n is the Fibonacci p-code length.

4. A device as claimed in claim 3, wherein each said functional stage includes:
a flip-flop provided with a "1" set input, a "0" set input, a "1" output, and a "0" output;
a switching unit provided with at least four inputs two outputs;
a convolution unit provided with at least four inputs and an output producing a convolution signal applied to said flip-flops of said lth, $(l-1)$th and $(l-p-1)$th functional stages;
said "0" output of said flip-flop being coupled to a first input of said convolution unit;
said output of said convolution unit being coupled to one of said inputs of said switching unit;
a first output of said switching unit, coupled to said "1" set input of said flip-flop;
a second output of said switching unit, coupled to said "0" set input of said flip-flop.

5. A device as claimed in claim 4, wherein said convolution unit comprises an AND gate having four inputs.

6. A device as claimed in claim 5, wherein a switching unit comprises:
two OR gates each being provided with two inputs;
an output of a first OR gate of said two OR gates, coupled to said "0" set input of said flip-flop;
an output of a second OR gate of said two OR gates, coupled to said "0" set input of said flip-flop;
one of said inputs of said second OR gate, being coupled to said output of said convolution unit;
devolution inputs, said inputs of said first OR gate serving as said devolution inputs of each of said functional stages;
the other input of said OR gate serving as said message input of each of said functional stages.

7. A device as claimed in claim 4, wherein said switching unit comprises:
two OR gates each being provided with two inputs;
an output of a first OR gate of said two OR gates, coupled to said "0" set input of said flip-flop;
an output of a second OR gate of said two OR gates, coupled to said "0" set input of said flip-flop;
one of said inputs of said second OR gate being coupled to said output of said convolution unit;
devolution inputs; said inputs of said first OR gate serving said devolution inputs of each of said functional stages;
the other input of said second OR gate, serving as said message input of each of said functional stages.

8. A device as claimed in claim 3, comprising $(l+1)$th, $(l-i-1)$th, $(l-p-j+1)$th and $(l-p-s+2)$th stages, each being provided with:
another message output;
a convolution inhibit output;
a devolution output;
$(p-1)$ convolution inhibit inputs;
a devolution control input;
$(p+2)$ devolution message inputs;
$(p+1)$ devolution set inputs;
said convolution inhibit output of said lth functional stage being coupled to an ith convolution inhibit input of said $(l-i-1)$th functional stage where i is the ith digit;
said devolution output of said lth functional state being coupled to a jth devolution set input of said (l−p j+1)th functional stage where j is the jth digit;

said devolution control inputs of all said functional stages being connected to a common point which is a devolution control input of said device for reduction of Fibonacci p-codes to minimal form; a (p+2)th devolution message input of said lth functional stage, coupled to said another message output of said (l+1)th functional stage;

an (sth) devolution message input of said lth functional stage coupled to said another message output of said (l−p−s+2)th functional stage, where i=1, 2 ... (p+1); j=1, 2 ... (p+1); and 2, 3 ... (p+2).

9. A device as claimed in claim 8, including switching units and a flip-flop, each of said functional stage (l−p) through (l−2p), inclusive, comprising: a devolution unit provided with at least (p+4) inputs and an output producing a devolution signal applied via said switching units to said flip-flop of said lth functional stage and to said flip-flops of said functional stages (l−p) through (l−2p), inclusive: said convolution unit provided with (l−p) convolution inhibit inputs and a convolution inhibit output being used, respectively, as said convolution inhibit inputs and said convolution inhibit output of any one of said n functional stages; said switching unit being provided with another (p+2) inputs: one of said inputs of said devolution unit, being coupled to said "1" output of said flip-flop; said output of said devolution unit, coupled to a first input of said (p+2) inputs of said switching unit; a second input and the remaining (p+2) inputs of said devolution unit, which serve, respectively, as said devolution control input and said message inputs of any one of said n functional stages; said (p+1) inputs of said switching unit serving as said devolution set inputs of any one of said n functional stages; said "0" set output of said flip-flop serving as said another message output of any one of said n functional stages.

10. A device as claimed in claim 9, wherein any one of said n functional stages comprises a convolution unit including:
an AND gate provided with four inputs and another (p−1) inputs;
an inverter;
an output of said inverter, which is said convolution inhibit output of said convolution unit;
an input of said inverter, coupled to the output of said AND gate.

11. A device as claimed in claim 10, including a switching unit comprising:
two OR gates each being provided with two inputs;
a first OR gate of said two OR gates, provided with another input coupled to said output of said devolution unit;
a second OR gate of said two OR gates, provided with another (p+1) inputs which serve as said devolution set inputs of each of said functional stages.

12. A device as claimed in claim 9, wherein said devolution unit comprises an AND gate having (p+4) inputs.

13. A device as claimed in claim 9, comprising a minimality indicator which includes:
a first OR gate provided with n inputs;
n identical stages;
each said stage of said minimality indicator comprising an AND gate and a second OR gate;
two inputs and an output of said AND gate;
p inputs and an output of said second OR gate;

said message output of each said lth functional stage, being coupled to an input of said AND gate of an lth stage of said minimality indicator;
the other input of said AND gate being coupled to said output of said second OR gate of said lth stage of said minimality indicator;
said p inputs of said second OR gate being coupled to said message outputs of said functional stages (l−1) through (l−p) inclusive;
said output of said AND gate of each lth stage of said minimality indicator being coupled to an lth input of said first OR gate of said minimality indicator, and said output of said first OR gate being used as the minimality signal output of said device for reduction of Fibonacci p-codes to minimal form.

14. A device as claimed in claim 8, wherein each said functional stage and an (l−k−1)th functional stage comprise:
(p−2) devolution inhibit inputs;
a devolution inhibit output;
said devolution inhibit output of said lth functional stage being coupled to a kth devolution inhibit inputs of said (l−k−1)th functional stage, where k=1, 2 ... (p−1).

15. A device as claimed in claim 14, wherein each of said n functional stages comprises a convolution unit including:
an AND gate provided with four inputs and another (p−1) inputs;
an inverter;
an output of said inverter, which is said convolution inhibit output of said convolution unit;
an input of said inverter, coupled to the output of said AND gate.

16. A device as claimed in claim 15, including a switching unit comprising:
two OR gates each being provided with two inputs;
a first OR gate of said two OR gates, provided with another input coupled to said output of said devolution unit;
a second OR gate of said two OR gates, provided with another (p+1) inputs which serve as said devolution set inputs of each of said functional stages.

17. A device as claimed in claim 14, wherein each said functional stage comprises a devolution unit including:
an AND gate provided with (p+4) inputs, another (p+2) inputs and an output;
an inverter coupled to said output of said AND gate;
said (p+2) inputs of said AND gate serving as said devolution inhibit inputs of said devolution unit;
an output of said inverter, which serves as said devolution inhibit output of each said functional stage.

18. A device as claimed in claim 14, including a complement input and comprising:
flip flops said flip-flops of said functional stages 1 through (n−p), inclusive, each being provided with count inputs;
said count inputs of said flip-flops, coupled to a common point which serves as said complement input of said device for reduction of Fibonacci p-codes to minimal form.

19. A device as claimed in claim 14, wherein each said functional stage comprises a devolution unit including:
an AND gate provided with (p+4) inputs, another (p+2) inputs and an output;
an inverter coupled to said output of said AND gate;

an output of said inverter, which serves as said devolution inhibit output of each said functional stage.

20. A device as claimed in claim 8, wherein any one of said n functional stages comprises a convolution unit including:
an AND gate provided with four inputs and another (p−1) inputs;
an inverter;
an output of said inverter, which is said convolution inhibit output of said convolution input;
an input of said inverter, coupled to the output of said AND gate.

21. A device as claimed in claim 8, including a complement input and comprising:
flip flops; said flip-flops of said functional stages 1 through (n−p), inclusive, each being provided with count inputs;
said count inputs of said flip-flops being connected to a common point which serves as said complement input of said device for reduction of Fibonacci p-codes to minimal form.

* * * * *